US008704806B2

(12) United States Patent
Hirakata et al.

(10) Patent No.: US 8,704,806 B2
(45) Date of Patent: Apr. 22, 2014

(54) DISPLAY DEVICE AND DRIVING METHOD THEREOF

(75) Inventors: Yoshiharu Hirakata, Kanagawa (JP); Shunpei Yamazaki, Tokyo (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 142 days.

(21) Appl. No.: 12/961,029

(22) Filed: Dec. 6, 2010

(65) Prior Publication Data

US 2011/0141069 A1 Jun. 16, 2011

(30) Foreign Application Priority Data

Dec. 10, 2009 (JP) ................................. 2009-281045

(51) Int. Cl.
*G06F 3/038* (2013.01)
*G09G 5/00* (2006.01)

(52) U.S. Cl.
USPC ................. 345/204; 345/76; 345/82; 345/87; 345/107

(58) Field of Classification Search
USPC ........................................... 345/55–111, 204
See application file for complete search history.

(56) References Cited

U.S. PATENT DOCUMENTS

| | | | | |
|---|---|---|---|---|
| 5,534,884 | A | 7/1996 | Mase et al. | |
| 5,731,856 | A | 3/1998 | Kim et al. | |
| 5,744,864 | A | 4/1998 | Cillessen et al. | |
| 6,294,274 | B1 | 9/2001 | Kawazoe et al. | |
| 6,563,174 | B2 | 5/2003 | Kawasaki et al. | |
| 6,727,522 | B1 | 4/2004 | Kawasaki et al. | |
| 6,927,765 | B1 * | 8/2005 | Masazumi et al. | 345/204 |
| 7,049,190 | B2 | 5/2006 | Takeda et al. | |
| 7,061,014 | B2 | 6/2006 | Hosono et al. | |
| 7,064,346 | B2 | 6/2006 | Kawasaki et al. | |
| 7,105,868 | B2 | 9/2006 | Nause et al. | |
| 7,211,825 | B2 | 5/2007 | Shih et al. | |
| 7,282,782 | B2 | 10/2007 | Hoffman et al. | |

(Continued)

FOREIGN PATENT DOCUMENTS

| | | | |
|---|---|---|---|
| EP | 1 209 748 | A1 | 5/2002 |
| EP | 1 737 044 | A1 | 12/2006 |

(Continued)

OTHER PUBLICATIONS

Kazuhiko Tsuda et al.; "Ultra low power consumption technologies for mobile TFT-LCDs"; IDW '02 (Proceedings of the 9th International Display Workshops); Dec. 4, 2002; pp. 295-298.

(Continued)

*Primary Examiner* — Michael Pervan
(74) *Attorney, Agent, or Firm* — Fish & Richardson P.C.

(57) ABSTRACT

An object of one embodiment of the present invention is to provide a display device and a driving method of a display device in each of which power consumption can be sufficiently reduced even in the case of displaying a moving image. In the display device and the driving method of a display device, a display screen is divided into a plurality of sub-screens in a row direction (a direction of a gate line) and image data in sequential frame periods is compared for each of the sub-screens. Whether or not the image data is rewritten is controlled on the basis of results of the comparison. In other words, writing is performed only in a region of the screen where rewriting is needed.

10 Claims, 9 Drawing Sheets

(56) References Cited

U.S. PATENT DOCUMENTS

| | | | |
|---|---|---|---|
| 7,297,977 | B2 | 11/2007 | Hoffman et al. |
| 7,321,353 | B2 | 1/2008 | Tsuda et al. |
| 7,323,356 | B2 | 1/2008 | Hosono et al. |
| 7,385,224 | B2 | 6/2008 | Ishii et al. |
| 7,402,506 | B2 | 7/2008 | Levy et al. |
| 7,411,209 | B2 | 8/2008 | Endo et al. |
| 7,453,065 | B2 | 11/2008 | Saito et al. |
| 7,453,087 | B2 | 11/2008 | Iwasaki |
| 7,462,862 | B2 | 12/2008 | Hoffman et al. |
| 7,468,304 | B2 | 12/2008 | Kaji et al. |
| 7,501,293 | B2 | 3/2009 | Ito et al. |
| 7,674,650 | B2 | 3/2010 | Akimoto et al. |
| 7,732,819 | B2 | 6/2010 | Akimoto et al. |
| 2001/0046027 | A1 | 11/2001 | Tai et al. |
| 2002/0056838 | A1 | 5/2002 | Ogawa |
| 2002/0132454 | A1 | 9/2002 | Ohtsu et al. |
| 2002/0140685 | A1 | 10/2002 | Yamamoto et al. |
| 2003/0189401 | A1 | 10/2003 | Kido et al. |
| 2003/0218222 | A1 | 11/2003 | Wager, III et al. |
| 2004/0038446 | A1 | 2/2004 | Takeda et al. |
| 2004/0127038 | A1 | 7/2004 | Carcia et al. |
| 2005/0017302 | A1 | 1/2005 | Hoffman |
| 2005/0199959 | A1 | 9/2005 | Chiang et al. |
| 2006/0035452 | A1 | 2/2006 | Carcia et al. |
| 2006/0043377 | A1 | 3/2006 | Hoffman et al. |
| 2006/0091793 | A1 | 5/2006 | Baude et al. |
| 2006/0108529 | A1 | 5/2006 | Saito et al. |
| 2006/0108636 | A1 | 5/2006 | Sano et al. |
| 2006/0110867 | A1 | 5/2006 | Yabuta et al. |
| 2006/0113536 | A1 | 6/2006 | Kumomi et al. |
| 2006/0113539 | A1 | 6/2006 | Sano et al. |
| 2006/0113549 | A1 | 6/2006 | Den et al. |
| 2006/0113565 | A1 | 6/2006 | Abe et al. |
| 2006/0169973 | A1 | 8/2006 | Isa et al. |
| 2006/0170111 | A1 | 8/2006 | Isa et al. |
| 2006/0197092 | A1 | 9/2006 | Hoffman et al. |
| 2006/0208977 | A1 | 9/2006 | Kimura |
| 2006/0228974 | A1 | 10/2006 | Thelss et al. |
| 2006/0231882 | A1 | 10/2006 | Kim et al. |
| 2006/0238135 | A1 | 10/2006 | Kimura |
| 2006/0244107 | A1 | 11/2006 | Sugihara et al. |
| 2006/0284171 | A1 | 12/2006 | Levy et al. |
| 2006/0284172 | A1 | 12/2006 | Ishii |
| 2006/0292777 | A1 | 12/2006 | Dunbar |
| 2007/0024187 | A1 | 2/2007 | Shin et al. |
| 2007/0046191 | A1 | 3/2007 | Saito |
| 2007/0052025 | A1 | 3/2007 | Yabuta |
| 2007/0054507 | A1 | 3/2007 | Kaji et al. |
| 2007/0090365 | A1 | 4/2007 | Hayashi et al. |
| 2007/0108446 | A1 | 5/2007 | Akimoto |
| 2007/0152217 | A1 | 7/2007 | Lai et al. |
| 2007/0172591 | A1 | 7/2007 | Seo et al. |
| 2007/0187678 | A1 | 8/2007 | Hirao et al. |
| 2007/0187760 | A1 | 8/2007 | Furuta et al. |
| 2007/0194379 | A1 | 8/2007 | Hosono et al. |
| 2007/0252928 | A1 | 11/2007 | Ito et al. |
| 2007/0272922 | A1 | 11/2007 | Kim et al. |
| 2007/0287296 | A1 | 12/2007 | Chang |
| 2008/0006877 | A1 | 1/2008 | Mardilovich et al. |
| 2008/0038882 | A1 | 2/2008 | Takechi et al. |
| 2008/0038929 | A1 | 2/2008 | Chang |
| 2008/0050595 | A1 | 2/2008 | Nakagawara et al. |
| 2008/0073653 | A1 | 3/2008 | Iwasaki |
| 2008/0083950 | A1 | 4/2008 | Pan et al. |
| 2008/0106191 | A1 | 5/2008 | Kawase |
| 2008/0128689 | A1 | 6/2008 | Lee et al. |
| 2008/0129195 | A1 | 6/2008 | Ishizaki et al. |
| 2008/0166834 | A1 | 7/2008 | Kim et al. |
| 2008/0182358 | A1 | 7/2008 | Cowdery-Corvan et al. |
| 2008/0224133 | A1 | 9/2008 | Park et al. |
| 2008/0254569 | A1 | 10/2008 | Hoffman et al. |
| 2008/0258139 | A1 | 10/2008 | Ito et al. |
| 2008/0258140 | A1 | 10/2008 | Lee et al. |
| 2008/0258141 | A1 | 10/2008 | Park et al. |
| 2008/0258143 | A1 | 10/2008 | Kim et al. |
| 2008/0296568 | A1 | 12/2008 | Ryu et al. |
| 2009/0068773 | A1 | 3/2009 | Lai et al. |
| 2009/0073325 | A1 | 3/2009 | Kuwabara et al. |
| 2009/0114910 | A1 | 5/2009 | Chang |
| 2009/0134399 | A1 | 5/2009 | Sakakura et al. |
| 2009/0152506 | A1 | 6/2009 | Umeda et al. |
| 2009/0152541 | A1 | 6/2009 | Maekawa et al. |
| 2009/0278122 | A1 | 11/2009 | Hosono et al. |
| 2009/0280600 | A1 | 11/2009 | Hosono et al. |
| 2010/0065844 | A1 | 3/2010 | Tokunaga |
| 2010/0092800 | A1 | 4/2010 | Itagaki et al. |
| 2010/0109002 | A1 | 5/2010 | Itagaki et al. |

FOREIGN PATENT DOCUMENTS

| | | | |
|---|---|---|---|
| EP | 2 226 847 | A2 | 9/2010 |
| JP | 60-198861 | A | 10/1985 |
| JP | 63-210022 | A | 8/1988 |
| JP | 63-210023 | A | 8/1988 |
| JP | 63-210024 | A | 8/1988 |
| JP | 63-215519 | A | 9/1988 |
| JP | 63-239117 | A | 10/1988 |
| JP | 63-265818 | A | 11/1988 |
| JP | 05-251705 | A | 9/1993 |
| JP | 08-264794 | A | 10/1996 |
| JP | 11-505377 | A | 5/1999 |
| JP | 2000-044236 | A | 2/2000 |
| JP | 2000-150900 | A | 5/2000 |
| JP | 2000-194305 | A | 7/2000 |
| JP | 2002-076356 | A | 3/2002 |
| JP | 2002-289859 | A | 10/2002 |
| JP | 2003-086000 | A | 3/2003 |
| JP | 2003-086808 | A | 3/2003 |
| JP | 2004-103957 | A | 4/2004 |
| JP | 2004-273614 | A | 9/2004 |
| JP | 2004-273732 | A | 9/2004 |
| WO | 2004/114391 | A1 | 12/2004 |

OTHER PUBLICATIONS

Asakuma, N et al., "Crystallization and Reduction of Sol-Gel-Derived Zinc Oxide Films by Irradiation With Ultraviolet Lamp," Journal of Sol-Gel Science and Technology, 2003, vol. 26, pp. 181-184.

Asaoka, Y et al., "29.1: Polarizer-Free Reflective LCD Combined With Ultra Low-Power Driving Technology," SID Digest '09 : SID International Symposium Digest of Technical Papers, 2009, pp. 395-398.

Chern, H et al., "An Analytical Model for the Above-Threshold Characteristics of Polysilicon Thin-Film Transistors," IEEE Transactions on Electron Devices, Jul. 1, 1995, vol. 42, No. 7, pp. 1240-1246.

Cho, D et al., "21.2: Al and Sn-Doped Zinc Indium Oxide Thin Film Transistors for AMOLED Back-Plane," SID Digest '09 : SID International Symposium Digest of Technical Papers, May 31, 2009, pp. 280-283.

Clark, S et al., "First Principles Methods Using Castep," Zeitschrift fur Kristallographie, 2005, vol. 220, pp. 567-570.

Coates. D et al., "Optical Studies of the Amorphous Liquid-Cholesteric Liquid Crystal Transition: The Blue Phase," Physics Letters, Sep. 10, 1973, vol. 45A, No. 2, pp. 115-116.

Costello, M et al., "Electron Microscopy of a Cholesteric Liquid Crystal and Its Blue Phase," Phys. Rev. A (Physical Review. A), May 1, 1984, vol. 29, No. 5, pp. 2957-2959.

Dembo, H et al., "RFCPUS on Glass and Plastic Substrates Fabricated by TFT Transfer Technology," IEDM 05: Technical Digest of International Electron Devices Meeting, Dec. 5, 2005, pp. 1067-1069.

Fortunato, E et al., "Wide-Bandgap High-Mobility ZnO Thin-Film Transistors Produced at Room Temperature," Appl. Phys. Lett. (Applied Physics Letters), Sep. 27, 2004, vol. 85, No. 13, pp. 2541-2543.

Fung, T et al., "2-D Numerical Simulation of High Performance Amorphous In—Ga—Zn—O TFTs for Flat Panel Displays," AM-FPD '08 Digest of Technical Papers, Jul. 2, 2008, pp. 251-252, The Japan Society of Applied Physics.

(56) References Cited

OTHER PUBLICATIONS

Godo, H et al., “P-9: Numerical Analysis on Temperature Dependence of Characteristics of Amorphous In—Ga—Zn—Oxide TFT,” SID Digest ’09 : SID International Symposium Digest of Technical Papers, May 31, 2009, pp. 1110-1112.
Godo, H et al., “Temperature Dependence of Characteristics and Electronic Structure for Amorphous In—Ga—Zn—Oxide TFT,” AM-FPD ’09 Digest of Technical Papers, Jul. 1, 2009, pp. 41-44.
Hayashi, R et al., “42.1: Invited Paper: Improved Amorphous In—Ga—Zn—O TFTs,” SID Digest ’08 : SID International Symposium Digest of Technical Papers, May 20, 2008, vol. 39, pp. 621-624.
Hirao, T et al., “Novel Top-Gate Zinc Oxide Thin-Film Transistors (ZnO TFTs) for AMLCDs,” Journal of the SID , 2007, vol. 15, No. 1, pp. 17-22.
Hosono, H et al., “Working hypothesis to explore novel wide band gap electrically conducting amorphous oxides and examples,” J. Non-Cryst. Solids (Journal of Non-Crystalline Solids), 1996, vol. 198-200, pp. 165-169.
Hosono, H, “68.3: Invited Paper:Transparent Amorphous Oxide Semiconductors for High Performance TFT,” SID Digest ’07 : SID International Symposium Digest of Technical Papers, 2007, vol. 38, pp. 1830-1833.
Hsieh, H et al., “P-29: Modeling of Amorphous Oxide Semiconductor Thin Film Transistors and Subgap Density of States,” SID Digest ’08 : SID International Symposium Digest of Technical Papers, 2008, vol. 39, pp. 1277-1280.
Ikeda., T et al., “Full-Functional System Liquid Crystal Display Using CG-Silicon Technology,” SID Digest ’04 : SID International Symposium Digest of Technical Papers, 2004, vol. 35, pp. 860-863.
Janotti, A et al., “Native Point Defects in ZnO,” Phys. Rev. B (Physical Review. B), 2007, vol. 76, No. 16, pp. 165202-1-165202-22.
Janotti, A et al., “Oxygen Vacancies in ZnO,” Appl. Phys. Lett. (Applied Physics Letters), 2005, vol. 87, pp. 122102-1-122102-3.
Jeong, J et al., “3.1: Distinguished Paper: 12.1-Inch WXGA AMOLED Display Driven by Indium-Gallium-Zinc Oxide TFTs Array,” SID Digest ’08 : SID International Symposium Digest of Technical Papers, May 20, 2008, vol. 39, No. 1, pp. 1-4.
Jin, D et al., “65.2: Distinguished Paper:World-Largest (6.5") Flexible Full Color Top Emission AMOLED Display on Plastic Film and Its Bending Properties,” SID Digest ’09 : SID International Symposium Digest of Technical Papers, May 31, 2009, pp. 983-985.
Kanno, H et al., “White Stacked Electrophosphorecent Organic Light-Emitting Devices Employing MOO3 as a Charge-Generation Layer,” Adv. Mater. (Advanced Materials), 2006, vol. 18, No. 3, pp. 339-342.
Kikuchi, H et al., “39.1: Invited Paper: Optically Isotropic Nano-Structured Liquid Crystal Composites for Display Applications,” SID Digest ’09 : SID International Symposium Digest of Technical Papers, May 31, 2009, pp. 578-581.
Kikuchi, H et al., “62.2: Invited Paper: Fast Electro-Optical Switching in Polymer-Stabilized Liquid Crystalline Blue Phases for Display Application,” SID Digest ’07 : SID International Symposium Digest of Technical Papers, 2007, vol. 38, pp. 1737-1740.
Kikuchi, H et al., “Polymer-Stabilized Liquid Crystal Blue Phases,” Nature Materials, Sep. 1, 2002, vol. 1, pp. 64-68.
Kim, S et al., “High-Performance oxide thin film transistors passivated by various gas plasmas,” The Electrochemical Society, 214th ECS Meeting, 2008, No. 2317, 1 page.
Kimizuka, N et al., “Spinel,YbFe2O4, and Yb2Fe3O7 Types of Structures for Compounds in the In2O3 and Sc2O3-A2O3-Bo Systems [A; Fe, Ga, or Al; B: Mg, Mn, Fe, Ni, Cu,or Zn] at Temperatures Over 1000° C.,” Journal of Solid State Chemistry, 1985, vol. 60, pp. 382-384.
Kimizuka, n. et al., “Syntheses and Single-Crystal Data of Homologous Compounds, In2O3(ZnO)m (m = 3, 4, and 5). InGaO3(ZnO)3, and Ga2O3(ZnO)m (m = 7, 8, 9, and 16) in the In2O3-ZnGa2O4-ZnO System,” Journal of Solid State Chemistry, Apr. 1, 1995, vol. 116, No. 1, pp. 170-178.
Kitzerow, H et al., “Observation of Blue Phases in Chiral Networks,” Liquid Crystals, 1993, vol. 14, No. 3, pp. 911-916.
Kurokawa, Y et al., “UHF RFCPUS on Flexible and Glass Substrates for Secure RFID Systems,” Journal of Solid-State Circuits , 2008, vol. 43, No. 1, pp. 292-299.
Lany, S et al., “Dopability, Intrinsic Conductivity, and Nonstoichiometry of Transparent Conducting Oxides,” Phys. Rev. Lett. (Physical Review Letters), Jan. 26, 2007, vol. 98, pp. 045501-1-045501-4.
Lee, H et al., “Current Status of, Challenges to, and Perspective View of AM-OLED,” IDW ’06 : Proceedings of the 13th International Display Workshops, Dec. 7, 2006, pp. 663-666.
Lee, J et al., “World’S Largest (15-Inch) XGA AMLCD Panel Using IGZO Oxide TFT,” SID Digest ’08 : SID International Symposium Digest of Technical Papers, May 20, 2008, vol. 39, pp. 625-628.
Lee, M et al., “15.4: Excellent Performance of Indium-Oxide-Based Thin-Film Transistors by DC Sputtering,” SID Digest ’09 : SID International Symposium Digest of Technical Papers, May 31, 2009, pp. 191-193.
Li, C et al. “Modulated Structures of Homologous Compounds InMO3(ZnO)m (M=In,Ga; m=Integer) Described by Four-Dimensional Superspace Group,” Journal of Solid State Chemistry, 1998, vol. 139, pp. 347-355.
Masuda, S et al., “Transparent thin film transistors using ZnO as an active channel layer and their electrical properties,” J. Appl. Phys. (Journal of Applied Physics), Feb. 1, 2003, vol. 93, No. 3, pp. 1624-1630.
Meiboom, S et al., “Theory of the Blue Phase of Cholesteric Liquid Crystals,” Phys. Rev. Lett. (Physical Review Letters), May 4, 1981, vol. 46, No. 18, pp. 1216-1219.
Miyasaka, M, “Suftla Flexible Microelectronics on Their Way to Business,” SID Digest ’07 : SID International Symposium Digest of Technical Papers, 2007, vol. 38, pp. 1673-1676.
Mo, Y et al., “Amorphous Oxide TFT Backplanes for Large Size AMOLED Displays,” IDW ’08 : Proceedings of the 6th International Display Workshops, Dec. 3, 2008, pp. 581-584.
Nakamura, “Synthesis of Homologous Compound with New Long-Period Structure,” NIRIM Newsletter, Mar. 1995, vol. 150, pp. 1-4 with English translation.
Nakamura, M et al., “The phase relations in the In2O3-Ga2ZnO4-ZnO system at 1350° C.,” Journal of Solid State Chemistry, Aug. 1, 1991, vol. 93, No. 2, pp. 298-315.
Nomura, K et al., “Thin-Film Transistor Fabricated in Single-Crystalline Transparent Oxide Semiconductor,” Science, May 23, 2003, vol. 300, No. 5623, pp. 1269-1272.
Nomura, K et al., “Amorphous Oxide Semiconductors for High-Performance Flexible Thin-Film Transistors,” Jpn. J. Appl. Phys. (Japanese Journal of Applied Physics) , 2006, vol. 45, No. 5B, pp. 4303-4308.
Nomura, K et al., “Room-Temperature Fabrication of Transparent Flexible Thin-Film Transistors Using Amorphous Oxide Semiconductors,” Nature, Nov. 25, 2004, vol. 432, pp. 488-492.
Nomura, K et al., “Carrier transport in transparent oxide semiconductor with intrinsic structural randomness probed using single-crystalline InGaO3(ZnO)5 films,” Appl. Phys. Lett. (Applied Physics Letters) , Sep. 13, 2004, vol. 85, No. 11, pp. 1993-1995.
Nowatari, H et al., “60.2: Intermediate Connector With Suppressed Voltage Loss for White Tandem OLEDs,” SID Digest ’09 : SID International Symposium Digest of Technical Papers, May 31, 2009, vol. 40, pp. 899-902.
Oba, F et al., “Defect energetics in ZnO: A hybrid Hartree-Fock density functional study,” Phys. Rev. B (Physical Review. B), 2008, vol. 77, pp. 245202-1-245202-6.
Oh, M et al., “Improving the Gate Stability of ZnO Thin-Film Transistors With Aluminum Oxide Dielectric Layers,” J. Electrochem. Soc. (Journal of the Electrochemical Society), 2008, vol. 155, No. 12, pp. H1009-H1014.
Ohara, H et al., “21.3: 4.0 in. QVGA AMOLED Display Using In-Ga-Zn-Oxide TFTs With a Novel Passivation Layer,” SID Digest ’09 : SID International Symposium Digest of Technical Papers, May 31, 2009, pp. 284-287.
Ohara, H et al., “Amorphous In-Ga-Zn-Oxide TFTs with Suppressed Variation for 4.0 inch QVGA AMOLED Display,” AM-FPD ’09 Digest of Technical Papers, Jul. 1, 2009, pp. 227-230, The Japan Society of Applied Physics.

(56) References Cited

OTHER PUBLICATIONS

Orita, M et al., "Amorphous transparent conductive oxide InGaO3(ZnO)m (m<4):a Zn4s conductor," Philosophical Magazine, 2001, vol. 81, No. 5, pp. 501-515.
Orita, M et al., "Mechanism of Electrical Conductivity of Transparent InGaZnO4," Phys. Rev. B (Physical Review. B), Jan. 15, 2000, vol. 61, No. 3, pp. 1811-1816.
Osada, T et al., "15.2: Development of Driver-Integrated Panel using Amorphous In-Ga-Zn-Oxide TFT," SID Digest '09 : SID International Symposium Digest of Technical Papers, May 31, 2009, pp. 184-187.
Osada, T et al., "Development of Driver-Integrated Panel Using Amorphous In-Ga-Zn-Oxide TFT," AM-FPD '09 Digest of Technical Papers, Jul. 1, 2009, pp. 33-36.
Park, J et al., "Dry etching of ZnO films and plasma-induced damage to optical properties," J. Vac. Sci. Technol. B (Journal of Vacuum Science & Technology B), Mar. 1, 2003, vol. 21, No. 2, pp. 800-803.
Park. J et al., "Improvements in the Device Characteristics of Amorphous Indium Gallium Zinc Oxide Thin-Film Transistors by Ar Plasma Treatment," Appl. Phys. Lett. (Applied Physics Letters), Jun. 26, 2007, vol. 90, No. 26, pp. 262106-1-262106-3.
Park, J et al., "Electronic Transport Properties of Amorphous Indium-Gallium-Zinc Oxide Semiconductor Upon Exposure to Water," Appl. Phys. Lett. (Applied Physics Letters), 2008, vol. 92, pp. 072104-1-072104-3.
Park, J et al., "High performance amorphous oxide thin film transistors with self-aligned top-gate structure," IEDM 09: Technical Digest of International Electron Devices Meeting, Dec. 7, 2009, pp. 191-194.
Park, Sang-Hee et al., "42.3: Transparent ZnO Thin Film Transistor for the Application of High Aperture Ratio Bottom Emission AM-OLED Display," SID Digest '08 : SID International Symposium Digest of Technical Papers, May 20, 2008, vol. 39, pp. 629-632.
Park, J et al., "Amorphous Indium-Gallium-Zinc Oxide TFTs and Their Application for Large Size AMOLED," AM-FPD '08 Digest of Technical Papers, Jul. 2, 2008, pp. 275-278.
Park, S et al., "Challenge to Future Displays: Transparent AM-OLED Driven by Peald Grown ZnO TFT," IMID '07 Digest, 2007, pp. 1249-1252.
Prins, M et al., "A Ferroelectric Transparent Thin-Film Transistor," Appl. Phys. Lett. (Applied Physics Letters), Jun. 17, 1996, vol. 68, No. 25, pp. 3650-3652.
Sakata, J et al., "Development of 4.0-In. AMOLED Display With Driver Circuit Using Amorphous In-Ga-Zn-Oxide TFTs," IDW '09 : Proceedings of the 16th International Display Workshops, 2009, pp. 689-692.
Son, K et al., "42.4L: Late-News Paper: 4 Inch QVGA AMOLED Driven by the Threshold Voltage Controlled Amorphous GIZO (Ga2O3-In2O3-ZnO) TFT," SID Digest '08 : SID International Symposium Digest of Technical Papers, May 20, 2008, vol. 39, pp. 633-636.
Takahashi, M et al., "Theoretical Analysis of IGZO Transparent Amorphous Oxide Semiconductor," IDW '08 : Proceedings of the 15th International Display Workshops, Dec. 3, 2008, pp. 1637-1640.
Ueno, K et al., "Field-Effect Transistor on SrTiO3 With Sputtered Al2O3 Gate Insulator," Appl. Phys. Lett. (Applied Physics Letters), Sep. 1, 2003, vol. 83, No. 9, pp. 1755-1757.
Van De Walle, C, "Hydrogen as a Cause of Doping in Zinc Oxide," Phys. Rev. Lett. (Physical Review Letters), Jul. 31, 2000, vol. 85, No. 5, pp. 1012-1015.
International Search Report, PCT Application No. PCT/JP2010/070633, dated Feb. 22, 2011, 2 pages.
Written Opinion, PCT Application No. PCT/JP2010/070633, dated Feb. 22, 2011, 4 pages.

* cited by examiner

DISPLAY DEVICE AND DRIVING METHOD THEREOF

TECHNICAL FIELD

The present invention relates to a driving method of a display device and a display device.

BACKGROUND ART

In recent years, a technique for forming a thin film transistor (TFT) by using a semiconductor thin film (having a thickness of approximately several nanometers to several hundred nanometers) formed over a substrate having an insulating surface has attracted attention. Thin film transistors are applied to a wide range of electronic devices such as ICs or electro-optical devices, and prompt development of thin film transistors that are to be used as switching elements in image display devices, in particular, is being pushed.

As electronic devices in which a thin film transistor is used, there are mobile devices such as a mobile phone or a notebook computer, and the like. For such a portable electronic device, power consumption which affects continuous operating time is a big problem. Also for a television or the like set which is increasing in size, it is important to suppress increase in power consumption associated with the increase in size.

In addition, in a display device, when image data which is input to a pixel is rewritten, an operation of writing the same image data is performed once again even in the case where image data in a period is the same as that in the preceding period. As a result, by performing the operation of writing the same image data a plurality of times, power consumption is increased. In order to suppress such increase in power consumption in a display device, for example, a technique has been disclosed in which a break period which is longer than a scanning period is set as a non-scanning period every time after image data is written by scanning a screen in the case of displaying a still image (for example, see Patent Document 1 and Non-Patent Document 1).

REFERENCES

[Patent Document]

[Patent Document 1] U.S. Pat. No. 7,321,353

[Non-Patent Document]

[Non-Patent Document 1] K. Tsuda et al., IDW'02, Proc., pp. 295-298

DISCLOSURE OF INVENTION

However, by the driving method described in Patent Document 1, power consumption can be reduced only in the case of displaying a still image in an entire screen; in the case of displaying a moving image, screen data needs to be written by scanning the entire screen. Thus, lower power consumption is demanded.

Therefore, an object of one embodiment of the present invention is to provide a display device and a driving method of a display device in each of which power consumption can be sufficiently reduced even in the case of displaying a moving image.

In the display device and the driving method of a display device, a display screen is divided into a plurality of sub-screens in a row direction (a direction of a gate line) and image data in sequential frame periods is compared for each of the sub-screens. Whether or not the image data is rewritten is controlled on the basis of results of the comparison.

In the display device and the driving method of a display device, an operation is performed as follows: image data of a first frame and image data of a subsequent second frame are stored; the image data of the first frame and the image data of the second frame are divided into a plurality of image data; match or mismatch of the image data of the first frame and the image data of the second frame is judged for the respective divided image data of the first frame and the second frame; and in the case where judge data shows mismatch, a gate line is selected and the image data of the second frame is written.

In the case where the judge data shows match, the image data of the second frame is not written and the display in the first frame period is maintained. In other words, selective writing is performed only in a region of the screen where rewriting is needed for the second frame period. Thus, an unnecessary writing operation can be omitted and power consumption of the display device can be therefore reduced.

An embodiment of the invention disclosed in this specification is a driving method of a display device including the steps of: dividing a display screen into a plurality of sub-screens in a row direction; judging match or mismatch of image data in a plurality of sequential frame periods for each of the sub-screens; and controlling whether or not rewriting of the image data into the plurality of sub-screens is performed on the basis of judge data.

Another embodiment of the invention disclosed in this specification is a driving method of a display device including the steps of: storing image data of a first frame and image data of a second frame; dividing the image data of the first frame and the image data of the second frame into a plurality of image data; judging match or mismatch of the image data of the first frame and the image data of the second frame for the respective divided image data of the first frame and the second frame; outputting judge data; not selecting a gate line in a gate signal generating circuit in the case where the judge data shows match; and selecting the gate line and writing the image data of the second frame in the case where the judge data shows mismatch.

Another embodiment of the invention disclosed in this specification is a driving method of a display device including the steps of: storing image data of a first frame and image data of a second frame; dividing the image data of the first frame and the image data of the second frame into a plurality of image data; judging match or mismatch of the image data of the first frame and the image data of the second frame for the respective divided image data of the first frame and the second frame; outputting judge data; not selecting a gate line and a source line in a gate signal generating circuit and a source signal generating circuit in the case where the judge data shows match; and selecting the gate line and the source line and writing the image data of the second frame in the case where the judge data shows mismatch.

Note that the image data of the first frame and the image data of the second frame are divided for a plurality of the gate lines included in the gate signal generating circuit and judged.

An embodiment of the invention disclosed in this specification is a display device including: a data storing circuit for storing image data of a first frame and image data of a second frame; a judging and image-data-processing circuit including a judging circuit for dividing the image data of the first frame and the image data of the second frame into a plurality of image data and judging match or mismatch of the image data of the first frame and the image data of the second frame for the respective divided image data of the first frame and the second frame and a judge data storing circuit for storing judge data obtained from the judging circuit; a gate signal generating circuit for controlling whether or not writing of the image data of the second frame is performed on the basis of the judge data; and a source signal generating circuit synchronizing the gate signal generating circuit.

An embodiment of the invention disclosed in this specification is a display device including: a data storing circuit for storing image data of a first frame and image data of a second frame; a judging and image-data-processing circuit including a judging circuit for dividing the image data of the first frame and the image data of the second frame into a plurality of image data and judging match or mismatch of the image data of the first frame and the image data of the second frame for the respective divided image data of the first frame and the second frame and a judge data storing circuit for storing judge data obtained from the judging circuit; a gate signal generating circuit for controlling whether or not writing of the image data of the second frame is performed on the basis of the judge data; and a source signal generating circuit synchronizing the gate signal generating circuit. The judging circuit judges by dividing the image data of the first frame and the image data of the second frame for a plurality of gate lines included in the gate signal generating circuit.

In the above structure, the display device can include a reference signal generating circuit for controlling the data storing circuit, the judging and image-data-processing circuit, the gate signal generating circuit, and the source signal generating circuit. Further, the display device can include a pixel portion displaying the image data with a plurality of pixels, wherein a transistor may be provided in each of the pixels.

Note that the ordinal numbers such as "first" and "second" in this specification are used for convenience and do not denote the order of steps and the stacking order of layers. In addition, the ordinal numbers in this specification do not denote particular names which specify the present invention.

In the display device and the driving method of a display device, a display screen is divided into a plurality of sub-screens in a row direction (a direction of a gate line) and image data in sequential frame periods is compared for each of the sub-screens. Whether or not the image data is rewritten is controlled on the basis of results of the comparison. In other words, writing is performed only in a region of the screen where rewriting is needed.

Thus, a display device and a driving method of a display device in which power consumption is sufficiently reduced can be provided because an unnecessary writing operation can be omitted also in the case of displaying a moving image.

BEST MODE FOR CARRYING OUT THE INVENTION

Hereinafter, embodiments of the present invention will be described in detail with reference to the accompanying drawings. However, the present invention is not limited to the description below, and it is easily understood by those skilled in the art that modes and details disclosed herein can be modified in various ways. Therefore, the present invention is not construed as being limited to description of the embodiments.

[Embodiment 1]

In this embodiment, one mode of a display device and that of a driving method of a display device are described with reference to FIG. 1, FIG. 2, FIG. 3, and FIG. 4.

Figure 1:
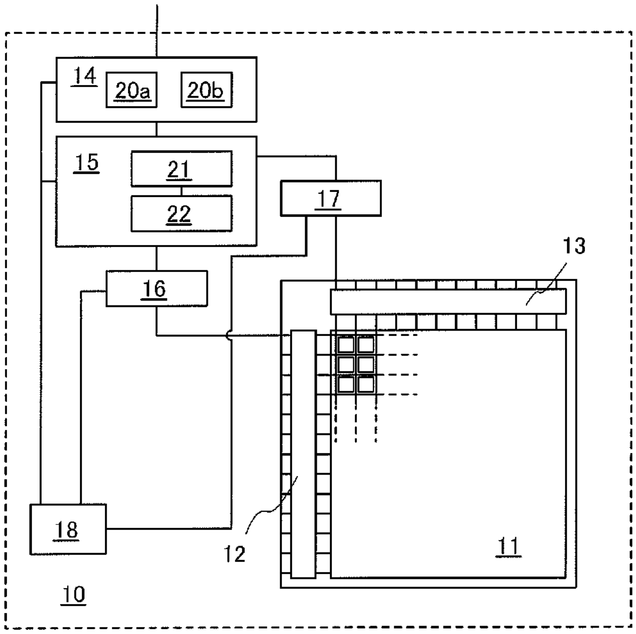
FIG. 1 is a diagram illustrating one mode of a display device.

One mode of a display device is illustrated in FIG. 1. A display device 10 illustrated in FIG. 1 includes a pixel portion 11, a gate driver circuit portion 12, a source driver circuit portion 13, a data storing circuit 14, a judging and image-data-processing circuit 15, a gate signal generating circuit 16, a source signal generating circuit 17, and a reference signal generating circuit 18.

The data storing circuit 14 includes a first-frame-data storing circuit 20*a* which stores image data $F_t$ of the first frame and a second-frame-data storing circuit 20*b* which stores image data $F_{t+1}$ of the second frame. The judging and image-data-processing circuit 15 includes a judging circuit 21 and a judge data storing circuit 22.

The data storing circuit 14, the judging and image-data-processing circuit 15, the gate signal generating circuit 16, and the source signal generating circuit 17 are controlled by the reference signal generating circuit 18.

An example of a driving method of the display device 10 is described with reference to FIG. 2 and FIG. 3.

Figure 3:
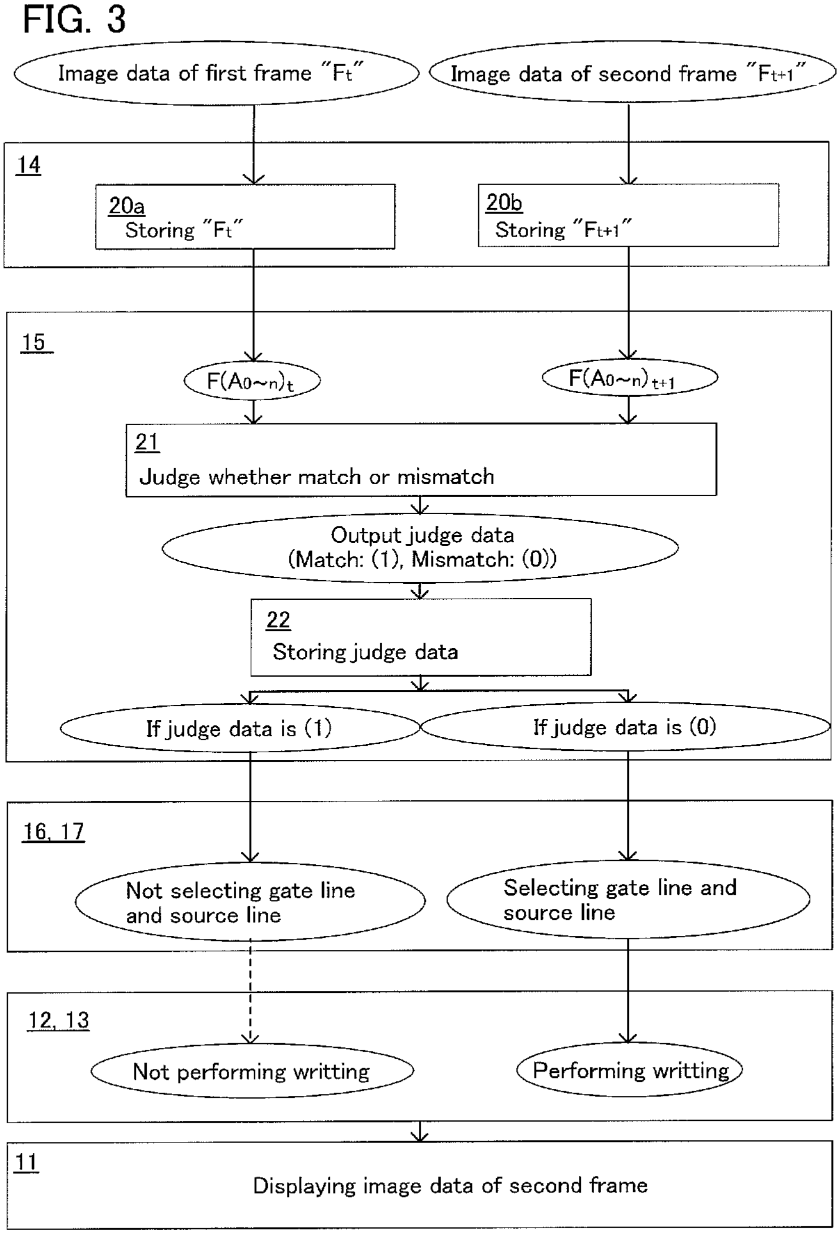
FIG. 3 is a flow chart illustrating one mode of the driving method of the display device.

First, as illustrated in FIG. 3, image data in a frame period t is the image data $F_t$ of the first frame and image data in a frame period t+1 subsequent to the frame period t is the image data $F_{t+1}$ of the second frame and they are stored in the data storing circuit 14. Note that in this specification, the image data $F_t$ of the first frame is image data for the entire screen (all pixels in the pixel portion 11) in the frame period t; the same can be applied to the image data $F_{t+1}$ of the second frame.

Note that in FIG. 1, the image data $F_t$ of the first frame is stored in the first-frame-data storing circuit 20*a* and the image data $F_{t+1}$ of the second frame is stored in the second-frame-data storing circuit 20*b*.

Then, as illustrated in FIG. 3, the image data $F_t$ of the first frame and the image data $F_{t+1}$ of the second frame are input to the judging and image-data-processing circuit 15 and match or mismatch of the data is judged.

In order to perform judging, first, the entire screen is divided into sub-screens $A_0$ to $A_n$. The screen is divided into the sub-screens only in a direction of a gate line and each of the sub-screens $A_0$ to $A_n$ has a plurality of gate lines 1 to m. The direction of the gate line is called a row direction and a plurality of pixels is provided for each of the gate lines. In this embodiment, an example in which the entire screen is divided into 10 sub-screens $A_0$ to $A_9$ as illustrated in FIG. 2 is described. In addition, each of the sub-screens has, for example, 108 gate lines 1 to 108 and the entire screen thus has 1080 gate lines.

Next, the input image data is divided for the sub-screens $A_0$ to $A_n$. The image data $F_t$ of the first frame is divided into image data $F(A_0)_t$ to $F(A_n)_t$ and the image data $F_{t+1}$ of the second frame is divided into image data $F(A_0)_{t+1}$ to $F(A_n)_{t+1}$.

Figure 2:
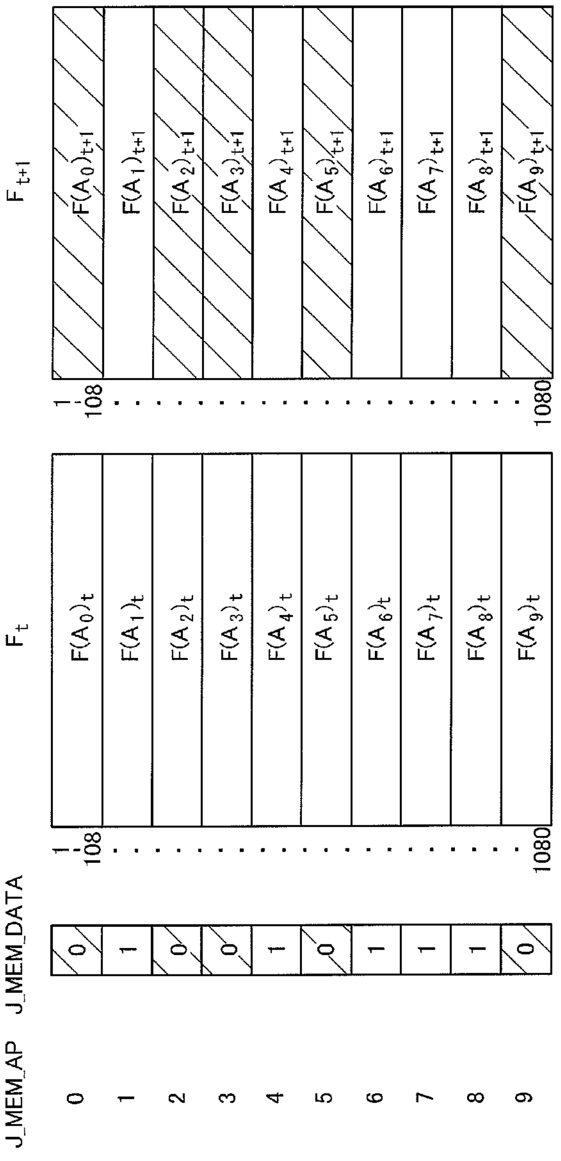
FIG. 2 is a schematic diagram illustrating one mode of a driving method of the display device.

In this embodiment, as illustrated in FIG. 2, the image data $F_t$ of the first frame is divided into 10 image data $F(A_0)_t$ to $F(A_9)_t$ corresponding to the respective sub-screens $A_0$ to $A_9$; similarly, the image data $F_{t+1}$ of the second frame is divided into 10 image data $F(A_0)_{t+1}$ to $F(A_9)_{t+1}$.

After that, as illustrated in FIG. 3, by the judging circuit 21, match or mismatch of the divided image data $F(A_0)_t$ to $F(A_9)_t$ and $F(A_0)_{t+1}$ to $F(A_9)_{t+1}$ is judged and judge data is stored in the judge data storing circuit 22. For example, the case where the divided image data $F(A_0)_t$ and $F(A_0)_{t+1}$ are matched is stored as 1 and the case where they are mismatched is stored as 0. In FIG. 2, the divided image data are mismatched when an address point J_MEM_AP of the judge data storing circuit is 0, 2, 3, 5, and 9, and judge data J_MEM_DATA when the address point is 0, 2, 3, 5, and 9 is 0. The divided image data are matched when the address point J_MEM_AP of the judge data storing circuit is 1, 4, 6, 7, and 8, and the judge data J_MEM_DATA when the address point is 1, 4, 6, 7, and 8 is 1.

Image data in a frame period t+2 subsequent to the frame period t+1 is image data $F_{t+2}$ of a third frame and the image data $F_{t+2}$ of the third frame is also divided into image data $F(A_0)_{t+2}$ to $F(A_n)_{t+2}$. Similarly to the image data $F_{t+1}$ of the second frame in FIG. 2, the image data $F_{t+2}$ of the third frame is divided into 10 image data $F(A_0)_{t+2}$ to $F(A_9)_{t+2}$. By the judging circuit 21, match or mismatch of the divided image data $F(A_0)_{t+1}$ to $F(A_9)_{t+1}$ and $F(A_0)_{t+2}$ to $F(A_9)_{t+2}$ is judged and judge data is stored in the judge data storing circuit 22. Judging is performed repeatedly in a similar manner up to the last frame period in a time-axis direction and judge data is stored in the judge data storing circuit 22.

The judge data stored in the judge data storing circuit 22 is output to the gate signal generating circuit 16 and the source signal generating circuit 17. Here, when the judge data shows match, a gate line is not selected in the gate signal generating circuit 16 and a source line is not selected in the source signal generating circuit 17. On the other hand, when the judge data shows mismatch, a gate line is selected in the gate signal generating circuit 16 and the source line is selected in the source signal generating circuit 17.

Note that judge data may be output every time when judge data in two sequential frame periods is stored; alternatively, judge data in three or more sequential frame periods may be accumulated in the judge data storing circuit 22 and the accumulated judge data may be output at once.

In each of the sub-screens, when the judge data shows match, a gate line is not selected in the gate signal generating circuit 16 and a source line is not selected in the source signal generating circuit 17. Therefore, writing of the image data of the second frame is not performed in the gate driver circuit portion 12 and the source driver circuit portion 13.

In each of the sub-screens, when the judge data shows mismatch, on the other hand, the gate line is selected in the gate signal generating circuit 16 and the source line is selected in the source signal generating circuit 17. Therefore, writing of the image data of the second frame is performed in the gate driver circuit portion 12 and the source driver circuit portion 13 and the image data of the second frame is displayed in the pixel portion 11.

The image data of the second frame is not written to a sub-screen in which the judge data shows match in the pixel portion 11, and the display in the first frame period is maintained. In other words, selective writing is performed only in a sub-screen where rewriting is needed for the second frame period. Thus, an unnecessary writing operation can be omitted and power consumption of the display device can be therefore reduced.

Figure 4:
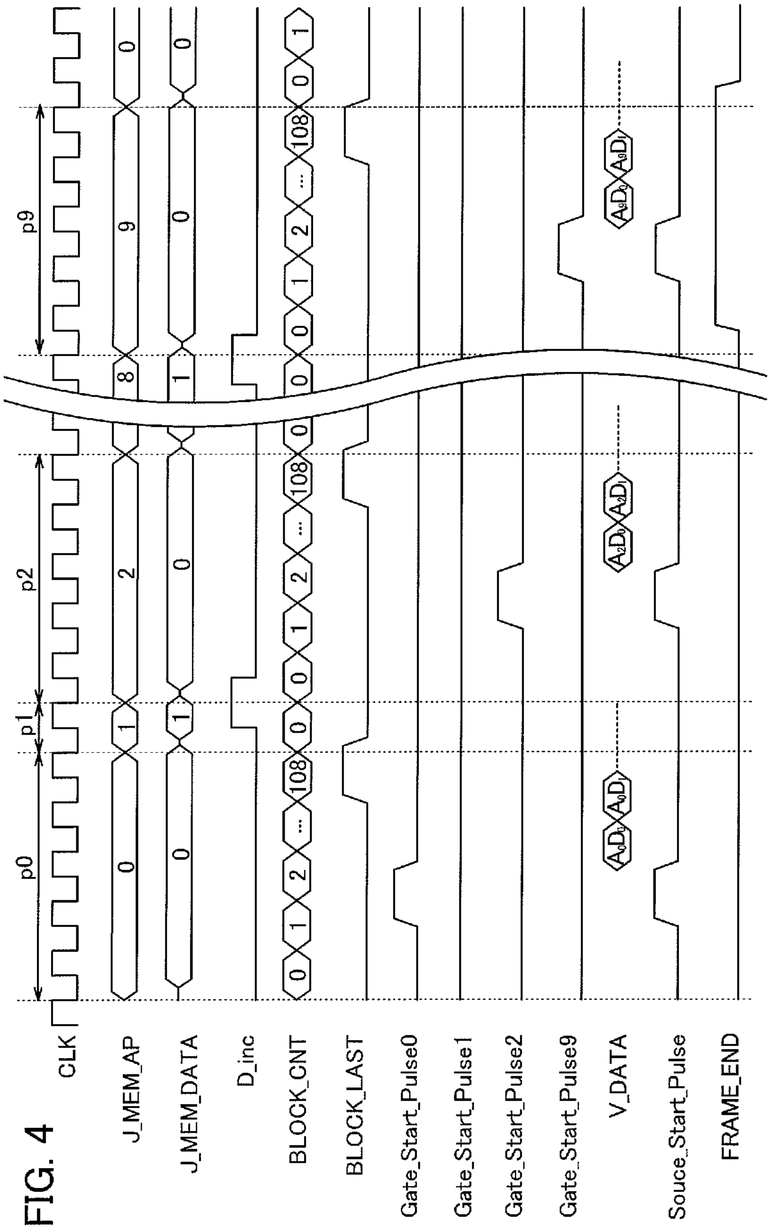
FIG. 4 is a timing chart illustrating one mode of the driving method of the display device.

FIG. 4 illustrates an example of a timing chart regarding the driving method of a display device. Note that the timing chart of FIG. 4 is one of applicable examples of the driving method of a display device and the present invention is not limited thereto.

In the timing chart of FIG. 4, CLK means a clock signal generated by the reference signal generating circuit 18; J_MEM_AP, the address point of the judge data storing circuit 22; and J_MEM_DATA, stored judge data.

In a period $p_0$, J_MEM_AP is 0, J_MEM_DATA becomes 0 on the basis of the judge data in FIG. 2, and a count-up operation is started from "1" by BLOCK_CNT. In this embodiment, since the sub-screen $A_0$ has the 108 gate lines, BLOCK_CNT counts up from 1 to 108.

In this embodiment, when the judge data shows match (1), the gate line and the source line are not selected; when the judge data shows mismatch (0), the gate line and the source line are selected. Thus, in the timing chart illustrated in FIG. 4, when J_MEM_DATA is 0, Gate_Start_Pulse 0 to Gate_Start_Pulse 9 and Source_Start_Pulse which correspond to J_MEM_AP 0 to J_MEM_AP 9 turn to High ("H") and D_inc turns to Low ("L"). When J_MEM_DATA is 1, Gate_Start_Pulse and Source_Start_Pulse turn to Low ("L") and D_inc turns to High ("H").

In a period $p_0$, since J_MEM_DATA is 0, Gate_Start_Pulse 0 and Source_Start_Pulse turn to "H" and the sub-screen $A_0$ is selected by an address pointer V_MEM_AP of an image data storing circuit (not shown), and $F(A_0)_{t+1}$ is written as image data V_DATA.

The image data V_DATA is sequentially written as data $A_0D_0$ to $A_0D_{107}$ which are divided for respective 108 gate lines included in the sub-screen $A_0$.

After BLOCK_CNT counts up to 108, BLOCK_LAST turns to "H" and BLOCK_CNT is reset to 0 and a period $p_1$ starts.

In the period $p_1$, since J_MEM_AP is 1 and J_MEM_DATA becomes 1 on the basis of the judge data in FIG. 2, Gate_Start_Pulse is "L" and Source_Start_Pulse turn to "L" and image data V_DATA is not written. Further, BLOCK_CNT does not count up and remains to be 0, and a subsequent period $p_2$ starts.

Selective writing of image data is performed on the basis of judge data follows.

In the last period $p_9$, J_MEM_AP is 9, J_MEM_DATA becomes 0 on the basis of the judge data in FIG. 2, and a count-up operation is started from "1" by BLOCK_CNT.

Since J_MEM_DATA is 0, Gate_Start_Pulse 9 and Source_Start_Pulse turn to "H" and the sub-screen $A_9$ is selected by the address pointer V_MEM_AP of the image data storing circuit, and $F(A_9)_{t+1}$ is written as image data V_DATA.

In the last period $p_9$ in which J_MEM_AP is 9, FRAME_END turns to "H". When BLOCK_LAST turns to "H" with the FRAME_END being "H", J_MEM_AP is reset to 0.

Note that in the pixel portion, a rewriting operation (a so-called refresh operation) of the image data may be performed at certain intervals even in a region in which judge data shows match and writing of image data is not needed.

As described above, image data of a second frame is not written to a sub-screen in which judge data shows match in the pixel portion, and a display in a first frame period is maintained. In other words, selective writing is performed only in a sub-screen where rewriting is needed for the second frame period. Thus, an unnecessary writing operation can be omitted and power consumption of the display device can be therefore reduced.

A variety of semiconductor elements such as a transistor and a memory element can be used in the display device 10.

A transistor can be used in the pixel portion 11 and driver circuits (e.g., the gate driver circuit portion 12, the source driver circuit portion 13, the data storing circuit 14, the judging and image-data-processing circuit 15, the gate signal generating circuit 16, the source signal generating circuit 17, and the reference signal generating circuit 18). Part or all of the driver circuits (e.g., the gate driver circuit portion 12 and the source driver circuit portion 13) which include the transistor can be formed over the substrate where the pixel portion 11 is formed, whereby a system-on-panel can be obtained.

Furthermore, a driver circuit (also referred to as an integrated circuit (IC)) separately formed using a single crystal semiconductor film or a polycrystalline semiconductor film over a substrate separately prepared may be mounted on the substrate provided with the pixel portion 11. Note that there is no particular limitation on the connection method of the driver circuit which is separately formed, and a chip on glass (COG) method, a wire bonding method, a tape automated bonding (TAB) method, or the like can be used.

Further, a method may be employed in which a wiring board including a driver circuit is formed and the wiring board and the pixel portion 11 are connected using a flexible printed circuit (FPC), a TAB tape, or a tape carrier package (TCP) and a variety of signals and potentials from the wiring board are supplied to the pixel portion 11.

There is no particular limitation on the structure of the transistor; for example, a top gate structure and a bottom gate structure such as a staggered structure and a planar structure can be employed. Further, the transistor may have a single gate structure including one channel formation region, a double gate structure including two channel formation regions, or a triple gate structure including three channel formation regions. Alternatively, the transistor may have a dual gate structure including two gate electrode layers positioned over and below a channel region with a gate insulating layer provided therebetween.

Examples of the material which can be used for a semiconductor layer of the transistor will be described below.

A material for a semiconductor layer included in a semiconductor element such as a transistor, the following materials can be used: an amorphous semiconductor manufactured by a vapor-phase growth method using a semiconductor material gas typified by silane or germane or by a sputtering method; a polycrystalline semiconductor formed by crystallizing the amorphous semiconductor with the use of light energy or thermal energy; a microcrystalline semiconductor (also referred to as a semi amorphous semiconductor); and the like. A single crystal semiconductor material or an organic semiconductor material may be used. The semiconductor layer can be deposited by a sputtering method, an LPCVD method, a plasma CVD method, or the like.

The amorphous semiconductor is typified by hydrogenated amorphous silicon, and the crystalline semiconductor is typified by polysilicon or the like. Polysilicon (polycrystalline silicon) includes so-called high-temperature polysilicon that contains polysilicon formed at a process temperature higher than or equal to 800° C. as its main component, so-called low-temperature polysilicon that contains polysilicon formed at a process temperature lower than or equal to 600° C. as its main component, and polysilicon formed by crystallizing amorphous silicon by using, for example, an element that promotes crystallization. It is needless to say that a microcrystalline semiconductor or a semiconductor partially including a crystalline phase can also be used.

As a semiconductor material, a compound semiconductor such as GaAs, InP, SiC, ZnSe, GaN, or SiGe as well as silicon (Si) or germanium (Ge) alone can be used.

In the case of using a crystalline semiconductor film for the semiconductor layer, the crystalline semiconductor film may be manufactured by any of a variety of methods (e.g., laser crystallization, thermal crystallization, or thermal crystallization using an element that promotes crystallization (the element also referred to as a catalytic element or a metal element) such as nickel).

The semiconductor layer may be doped with a small amount of an impurity element (such as boron or phosphorus) in order to control the threshold voltage of a transistor.

As described above, in this embodiment, a highly-functional display device in which power consumption is further reduced can be provided.

[Embodiment 2]

In this embodiment, one example of a transistor which can be applied to the display device disclosed in this specification will be described.

FIGS. 5A to 5D each illustrate an example of a cross-sectional structure of a transistor.

Figure 5A:
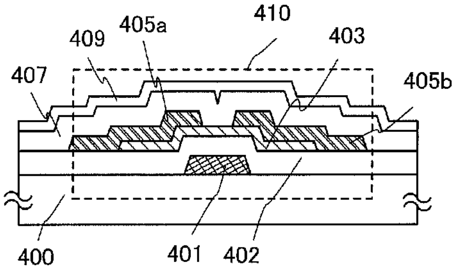
FIGS. 5A to 5D are diagrams each illustrating one mode of a transistor applicable to the display device.

A transistor 410 illustrated in FIG. 5A is one of bottom gate thin film transistors and is also called an inverted staggered thin film transistor.

The transistor 410 includes, over a substrate 400 having an insulating surface, a gate electrode layer 401, a gate insulating layer 402, an oxide semiconductor layer 403, a source electrode layer **405*a*, and a drain electrode layer 405*b*. Further, an insulating layer 407 stacked over the oxide semiconductor layer 403 is provided so as to cover the transistor 410. A protective insulating layer 409 is formed over the insulating layer 407**.

Figure 5B:
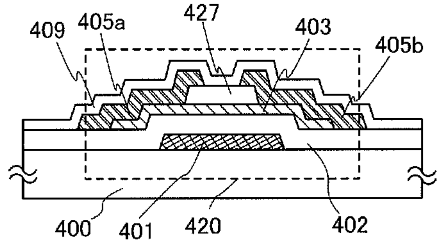

A thin film transistor 420 illustrated in FIG. 5B is one of bottom gate structures called a channel protective structure (also referred to as a channel-stop structure) and is also referred to as an inverted staggered thin film transistor.

The transistor 420 includes, over the substrate 400 having an insulating surface, the gate electrode layer 401, the gate insulating layer 402, the oxide semiconductor layer 403, an insulating layer 427 which functions as a channel protective layer covering a channel formation region of the oxide semiconductor layer 403, the source electrode layer **405*a*, and the drain electrode layer 405*b*. Further, the protective insulating layer 409 is formed so as to cover the transistor 420**.

Figure 5C:
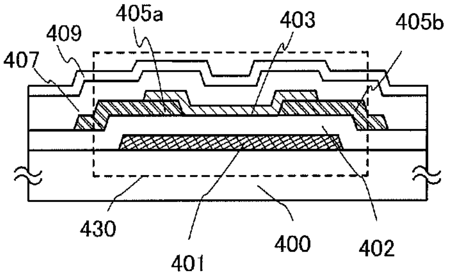

A thin film transistor 430 illustrated in FIG. 5C is a bottom gate thin film transistor and includes, over the substrate 400 having an insulating surface, the gate electrode layer 401, the gate insulating layer 402, the source electrode layer **405*a*, the drain electrode layer 405*b*, and the oxide semiconductor layer 403. Further, the insulating layer 407 being in contact with the oxide semiconductor layer 403 is provided so as to cover the transistor 430. The protective insulating layer 409 is formed over the insulating layer 407**.

In the transistor 430, the gate insulating layer 402 is provided over and in contact with the substrate 400 and the gate electrode layer 401; the source electrode layer **405*a* and the drain electrode layer 405*b* are provided over and in contact with the gate insulating layer 402. Further, the oxide semiconductor layer 403 is provided over the gate insulating layer 402, the source electrode layer 405*a*, and the drain electrode layer 405*b***.

Figure 5D:
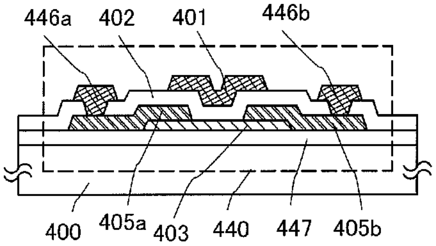

A thin film transistor 440 illustrated in FIG. 5D is one of top gate thin film transistors. The transistor 440 includes, over the substrate 400 having an insulating surface, an insulating layer

447, the oxide semiconductor layer 403, the source electrode layer 405*a*, the drain electrode layer 405*b*, the gate insulating layer 402, and the gate electrode layer 401. A wiring layer 446*a* and a wiring layer 446*b* are provided in contact with and electrically connected to the source electrode layer 405*a* and the drain electrode layer 405*b*, respectively.

In this embodiment, the oxide semiconductor layer 403 is used as a semiconductor layer.

As the oxide semiconductor layer 403, a four-component metal oxide film such as an In—Sn—Ga—Zn—O film; a three-component metal oxide film such as an In—Ga—Zn—O film, an In—Sn—Zn—O film, an In—Al—Zn—O film, a Sn—Ga—Zn—O film, an Al—Ga—Zn—O film, or a Sn—Al—Zn—O film; or a two-component metal oxide film such as an In—Zn—O film, a Sn—Zn—O film, an Al—Zn—O film, a Zn—Mg—O film, a Sn—Mg—O film, or an In—Mg—O film; or a single-component metal oxide film such as an In—O film, a Sn—O film, or a Zn—O film can be used. Further, the above oxide semiconductor layer may contain $SiO_2$.

As the oxide semiconductor layer 403, a thin film expressed by $InMO_3(ZnO)_m$ (m>0) can be used. Here, M represents one or more metal elements selected from Ga, Al, Mn, and Co. For example, M can be Ga, Ga and Al, Ga and Mn, Ga and Co, or the like. An oxide semiconductor whose composition formula is represented as $InMO_3(ZnO)_m$ (m>0) where at least Ga is contained as M is referred to as an In—Ga—Zn—O-based oxide semiconductor, and a thin film of the In—Ga—Zn—O-based oxide semiconductor is referred to as the above In—Ga—Zn—O film.

In each of the transistors 410, 420, 430, and 440 which use the oxide semiconductor layer 403, the amount of current in an off state (off state current) can be small. Therefore, the holding period of an electric signal of image data or the like can be extended and an interval between writing operations can be set longer. Thus, the number of times of performing a refresh operation can be smaller, whereby power consumption can be more effectively suppressed.

In addition, each of the transistors 410, 420, 430, and 440 which use the oxide semiconductor layer 403 can operate at high speed because they can achieve field-effect mobility that is relatively higher among transistors which use an amorphous semiconductor. Therefore, a display device having higher functionality and being capable of faster response can be realized.

Although there is no particular limitation on a substrate which can be used as the substrate 400 having an insulating surface, it is necessary that the substrate have heat resistance high enough to withstand heat treatment to be performed later. A glass substrate of barium borosilicate glass, aluminoborosilicate glass, or the like can be used.

In the case where a glass substrate is used and the temperature at which the heat treatment is to be performed later is high, a glass substrate whose strain point is higher than or equal to 730° C. is preferably used. For a glass substrate, a glass material such as aluminosilicate glass, aluminoborosilicate glass, or barium borosilicate glass is used, for example. Note that a glass substrate containing a larger amount of barium oxide (BaO) than boric oxide ($B_2O_3$), which is practical heat-resistance glass, may be used.

Note that instead of the above glass substrate, a substrate formed of an insulator such as a ceramic substrate, a quartz substrate, or a sapphire substrate may be used. Alternatively, crystallized glass or the like may be used. Further alternatively, a plastic substrate or the like can be used as appropriate.

In the bottom gate transistors 410, 420, and 430, an insulating film serving as a base film may be provided between the substrate 400 and the gate electrode layer 401. The base film has a function of preventing diffusion of an impurity element from the substrate 400, and can be formed to have a single-layer structure or a stacked-layer structure using one or more of a silicon nitride film, a silicon oxide film, a silicon nitride oxide film, and a silicon oxynitride film.

The gate electrode layer 401 can be formed to have a single-layer structure or a stacked-layer structure using a metal material such as molybdenum, titanium, chromium, tantalum, tungsten, aluminum, copper, neodymium, or scandium, or an alloy material which contains any of these materials as its main component.

As a two-layer structure of the gate electrode layer 401, for example, a two-layer structure in which a molybdenum layer is stacked over an aluminum layer, a two-layer structure in which a molybdenum layer is stacked over a copper layer, a two-layer structure in which a titanium nitride layer or a tantalum nitride layer is stacked over a copper layer, or a two-layer structure in which a titanium nitride layer and a molybdenum layer are stacked is preferable. Alternatively, a three-layer structure in which a tungsten layer or a tungsten nitride layer, an aluminum-silicon alloy layer or an aluminum-titanium alloy layer, and a titanium nitride layer or a titanium layer are stacked is preferable. Note that the gate electrode layer can be formed using a light-transmitting conductive film. As an example of a material of the light-transmitting conductive film, light-transmitting conductive oxide or the like can be given.

The gate insulating layer 402 can be formed by a plasma CVD method, a sputtering method, or the like to have a single-layer structure or a stacked-layer structure using any of a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, and a hafnium oxide layer.

The gate insulating layer 402 can have a stacked-layer structure in which a silicon nitride layer and a silicon oxide layer are stacked over the gate electrode layer in the order presented. For example, a gate insulating layer having a thickness of 100 nm is formed in such a manner that a silicon nitride layer ($SiN_y$ (y>0)) having a thickness greater than or equal to 50 nm and less than or equal to 200 nm is formed by a sputtering method as a first gate insulating layer and then a silicon oxide layer ($SiO_x$ (x>0)) having a thickness greater than or equal to 5 nm and less than or equal to 300 nm is stacked as a second gate insulating layer over the first gate insulating layer. The thickness of the gate insulating layer 402 may be set as appropriate depending on the desired characteristics of the transistor. The thickness may be approximately 350 nm to 400 nm.

For a conductive film used for the source and drain electrode layers 405*a* and 405*b*, for example, an element selected from aluminum (Al), chromium (Cr), copper (Cu), tantalum (Ta), titanium (Ti), molybdenum (Mo), and tungsten (W), an alloy containing any of these elements as a component, an alloy film in which any of these elements are combined, or the like can be used. Alternatively, a structure may be employed in which a layer of a high-melting-point metal such as chromium (Cr), tantalum (Ta), titanium (Ti), molybdenum (Mo), or tungsten (W) is stacked over and/or below a metal layer of aluminum (Al) or copper (Cu). Furthermore, in the case of using an aluminum (Al) material to which an element preventing generation of hillocks or whiskers in an aluminum (Al) film such as silicon (Si), titanium (Ti), tantalum (Ta), tungsten (W), molybdenum (Mo), chromium (Cr), neodymium (Nd), scandium (Sc), or yttrium (Y) is added, heat resistance can be improved.

A material similar to that of the source and drain electrode layers 405*a* and 405*b* can be also used for a conductive film used for the wiring layer 446*a* and the wiring layer 446*b* which are respectively connected to the source electrode layer 405*a* and the drain electrode layer 405*b*.

The source electrode layer 405*a* and the drain electrode layer 405*b* may have a single-layer structure or a stacked-layer structure using two or more layers. For example, a single-layer structure of an aluminum film containing silicon, a two-layer structure in which a titanium film is stacked over an aluminum film, a three-layer structure in which a titanium (Ti) film, an aluminum film, and a titanium (Ti) film are stacked in the order presented, and the like can be given.

Alternatively, the conductive film to be the source and drain electrode layers 405*a* and 405*b* (including a wiring layer formed using the same layer as the source and drain electrode layers) may be formed using conductive metal oxide. As conductive metal oxide, indium oxide ($In_2O_3$), tin oxide ($SnO_2$), zinc oxide (ZnO), an alloy of indium oxide and tin oxide ($In_2O_3$—$SnO_2$, abbreviated to ITO), an alloy of indium oxide and zinc oxide ($In_2O_3$—ZnO), or the metal oxide material to which silicon or silicon oxide is added can be used.

As the insulating layers 407, 427, and 447 and the protective insulating layer 409, inorganic insulating films such as an oxide insulating film or a nitride insulating film can be favorably used.

As the insulating layers 407, 427, and 447, an inorganic insulating film typical examples of which are a silicon oxide film, a silicon oxynitride film, an aluminum oxide film, and an aluminum oxynitride film can be used.

For the protective insulating layer 409, an inorganic insulating film such as a silicon nitride film, an aluminum nitride film, a silicon nitride oxide film, or an aluminum nitride oxide film can be used.

Further, a planarization insulating film may be formed over the protective insulating layer 409 so that surface roughness due to the transistor is reduced. The planarization insulating film can be formed using a heat-resistant organic material such as polyimide, acrylic, benzocyclobutene, polyamide, or epoxy. Other than such organic materials, it is also possible to use a low-dielectric constant material (a low-k material), a siloxane-based resin, PSG (phosphosilicate glass), BPSG (borophosphosilicate glass), or the like. Note that the planarization insulating film may be formed by stacking a plurality of insulating films formed using these materials.

The components of the transistors illustrated in FIGS. 5A to 5D other than the semiconductor layer (i.e., the substrate, the gate electrode layer, the gate insulating layer, the source electrode layer, the drain electrode layer, the wiring layer, the insulating layer, and the like) and the structures thereof can be applied to the transistor described in Embodiment 1 which includes a semiconductor layer of a different semiconductor material.

As described above, in this embodiment, a highly-functional display device in which power consumption is further reduced can be provided by using a transistor including an oxide semiconductor layer.

[Embodiment 3]

In this embodiment, an example of a transistor including an oxide semiconductor layer and a manufacturing method thereof are described in detail with reference to FIGS. 6A to 6E. The same portion as or a portion having a function similar to those in the above embodiment can be formed in a manner similar to that described in the above embodiment, and also the steps similar to those in the above embodiment can be performed in a manner similar to that described in the above embodiment, and repetitive description is omitted. In addition, detailed description of the same portions is not repeated.

FIGS. 6A to 6E illustrate an example of a cross-sectional structure of a transistor. A transistor 310 illustrated in FIGS. 6A to 6E is an inverted staggered thin film transistor having a bottom gate structure, which is similar to the transistor 410 illustrated in FIG. 5A.

An oxide semiconductor used for a semiconductor layer in this embodiment is an intrinsic (i-type) semiconductor or a semiconductor extremely close to an intrinsic (i-type) semiconductor which is highly purified by removing hydrogen that is an n-type impurity from an oxide semiconductor so that impurities that are not main components of the oxide semiconductor are contained as little as possible. In other words, the oxide semiconductor is not an i-type semiconductor which is made by adding an impurity but an i-type (intrinsic) semiconductor or a semiconductor extremely close to an i-type semiconductor which is highly purified by removing impurities such as hydrogen and water as much as possible. Therefore, the oxide semiconductor layer included in the transistor 310 is an oxide semiconductor layer which is highly purified and electrically i-type (intrinsic) oxide semiconductor layer.

In addition, the highly purified oxide semiconductor includes extremely small number (close to zero) of carriers and the carrier concentration is lower than $1\times10^{14}/cm^3$, preferably lower than $1\times10^{12}/cm^3$, more preferably lower than $1\times10^{11}/cm^3$.

Since the number of carriers in the oxide semiconductor is extremely small, off state current in current vs. voltage characteristics in applying reverse bias of a transistor can be small. It is preferable that off state current be as small as possible.

Specifically, in a transistor including the above-described oxide semiconductor layer, the off state current per micrometer of the channel width can be less than or equal to 10 aA/μm ($1\times10^{-17}$ A/μm), and further can be less than or equal to 1 aA/μm ($1\times10^{-18}$ A/μm).

The resistance to flow of off state current in a transistor can be represented to as the off state resistivity. The off state resistivity is the resistivity of a channel formation region when the transistor is in an off state, which can be calculated from the off state current.

Specifically, the resistivity when the transistor is in an off state (off state resistivity R) can be calculated using Ohm's law from the off state current and the drain voltage, which leads to the off state resistivity ρ which can be calculated using Formula, ρ=RAIL (R is the off state resistivity), from the cross-sectional area A of the channel formation region and the length L of the channel formation region (which corresponds to the distance between a source electrode and a drain electrode).

The cross-sectional area A can be calculated from A=dW where the thickness of the channel formation region is d and the channel width is W The length L of the channel formation region is the channel length L. In this manner, the off state resistivity can be calculated from the off state current.

The off state resistivity of the transistor including the oxide semiconductor layer in this embodiment is preferably greater than or equal to $1\times10^{9}\Omega\cdot m$, more preferably greater than or equal to $1\times10^{10}\Omega\cdot m$.

By using a transistor with an extremely small current value in an off state (off state current) as the transistor in the pixel portion in Embodiment 1, a refresh operation in a still image region can be performed with a small number of times of writing of image data.

The temperature dependence of on state current can hardly be observed and the off state current remains to be small in the transistor 310 which includes the above-described oxide semiconductor layer.

A process of manufacturing the transistor 310 over a substrate 305 will be described below with reference to FIGS. 6A to 6E. The transistor 310 includes, over the substrate 305, a gate electrode layer 311, a gate insulating layer 307, an oxide semiconductor layer 331, a source electrode layer 315*a*, and a drain electrode layer 315*b*. Further, an insulating layer 316 stacked over the oxide semiconductor layer 331 is provided so as to cover the transistor 310. A protective insulating layer 306 is provided over the insulating layer 316.

First, after a conductive film is formed over the substrate 305 having an insulating surface, the gate electrode layer 311 is formed by a first photolithography step. Note that a resist mask may be formed by an ink-jet method. Formation of the resist mask by an ink-jet method needs no photomask; thus, manufacturing cost can be reduced.

As the substrate 305 having an insulating surface, a substrate similar to the substrate 400 described in Embodiment 2 can be used. In this embodiment, a glass substrate is used as the substrate 305.

An insulating film serving as a base film may be provided between the substrate 305 and the gate electrode layer 311. The base film has a function of preventing diffusion of an impurity element from the substrate 305, and can be formed to have a single-layer structure or a stacked-layer structure using one or more of a silicon nitride film, a silicon oxide film, a silicon nitride oxide film, and a silicon oxynitride film.

The gate electrode layer 311 can be formed to have a single-layer structure or a stacked-layer structure using a metal material such as molybdenum, titanium, chromium, tantalum, tungsten, aluminum, copper, neodymium, or scandium, or an alloy material which contains any of these materials as its main component.

For example, as a two-layer structure of the gate electrode layer 311, any of the following structures is preferable: a two-layer structure in which a molybdenum layer is stacked over an aluminum layer, a two-layer structure in which a molybdenum layer is stacked over a copper layer, a two-layer structure in which a titanium nitride layer or a tantalum nitride layer is stacked over a copper layer, a two-layer structure in which a titanium nitride layer and a molybdenum layer are stacked, and a two-layer structure in which a tungsten nitride layer and a tungsten layer are stacked. Alternatively, a three-layer structure in which a tungsten layer or a tungsten nitride layer, an aluminum-silicon alloy layer or an aluminum-titanium alloy layer, and a titanium nitride layer or a titanium layer are stacked is preferable.

Then, a gate insulating layer 307 is formed over the gate electrode layer 311.

The gate insulating layer 307 can be formed by a plasma CVD method, a sputtering method, or the like to have a single-layer structure or a stacked-layer structure using any of a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, and a hafnium oxide layer. For example, in the case where a silicon oxide film is formed by a sputtering method, a silicon target or a quartz target is used as a target, and oxygen or a mixed gas of oxygen and argon is used as a sputtering gas.

For the oxide semiconductor in this embodiment, an oxide semiconductor which is made to be an i-type semiconductor or a substantially i-type semiconductor by removing an impurity is used. Such a highly purified oxide semiconductor is highly sensitive to an interface state and interface charge; thus, an interface between the oxide semiconductor layer and the gate insulating layer is important. Therefore, the gate insulating layer which is in contact with the highly purified oxide semiconductor layer needs high quality.

For example, a high-density plasma CVD method using microwaves (2.45 GHz) is preferably adopted because an insulating layer can be dense and have high withstand voltage and high quality. This is because when the highly purified oxide semiconductor layer is closely in contact with the high-quality gate insulating layer, the interface state can be reduced and interface properties can be favorable.

It is needless to say that another film formation method such as a sputtering method or a plasma CVD method can be employed as long as a high-quality insulating layer can be formed as the gate insulating layer 307. Moreover, it is possible to use as the gate insulating layer 307 an insulating layer whose quality and characteristics of an interface with the oxide semiconductor layer are improved by heat treatment performed after the formation of the insulating layer. In any case, any insulating layer may be used as long as the insulating layer has characteristics of enabling reduction in interface state density of an interface between the insulating layer and the oxide semiconductor layer and formation of a favorable interface as well as having favorable film quality as the gate insulating layer 307.

The gate insulating layer 307 may have a stacked-layer structure in which a nitride insulating layer and an oxide insulating layer are stacked over the gate electrode layer 311. For example, a gate insulating layer having a thickness of 100 nm is formed in such a manner that a silicon nitride layer ($SiN_y$ (y>0)) having a thickness greater than or equal to 50 nm and less than or equal to 200 nm is formed by a sputtering method as a first gate insulating layer and then a silicon oxide layer ($SiO_x$ (x>0)) having a thickness greater than or equal to 5 nm and less than or equal to 300 nm is stacked as a second gate insulating layer over the first gate insulating layer. The thickness of the gate insulating layer may be set as appropriate depending on the desired characteristics of the transistor. The thickness may be approximately 350 nm to 400 nm.

Pretreatment for deposition is preferably performed so that hydrogen, hydroxy group, and moisture are contained as little as possible in the gate insulating layer 307 and an oxide semiconductor film 330 formed later. As the pretreatment for deposition, in a preheating chamber of a sputtering apparatus, preheating may be performed on the substrate 305 over which the gate electrode layer 311 is formed or the substrate 305 over which the gate electrode layer 311 and the gate insulating layer 307 are formed. Thus, an impurity such as hydrogen or moisture attached to the substrate 305 is eliminated and evacuated. As an exhaustion unit provided in the preheating chamber, a cryopump is preferable. Note that this preheating treatment can be omitted. This preheating may be similarly performed on the substrate 305 over which the gate electrode layer 311, the gate insulating layer 307, the oxide semiconductor layer 331, the source electrode layer 315*a*, and the drain electrode layer 315*b* are formed before formation of the insulating layer 316.

In this embodiment, a silicon oxynitride layer having a thickness of 100 nm is formed as the gate insulating layer 307 with a plasma CVD method.

Figure 6A:
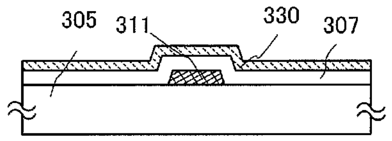
FIGS. 6A to 6E are diagrams illustrating one mode of a manufacturing method of a transistor applicable to a display device.
Figure 6B:
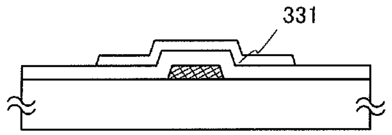
Figure 6C:
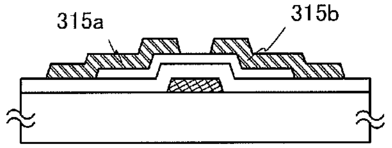

Next, over the gate insulating layer 307, the oxide semiconductor film 330 having a thickness greater than or equal to 2 nm and less than or equal to 200 nm, preferably greater than or equal to 5 nm and less than or equal to 30 nm is formed (see FIG. 6A).

Note that before the oxide semiconductor film 330 is formed by a sputtering method, powdery substances (also referred to as particles or dust) attached on a surface of the gate insulating layer 307 are preferably removed by reverse sputtering in which an argon gas is introduced and plasma is generated. The reverse sputtering is a method in which voltage is applied to a substrate side, not to a target side, using an RF power source in an argon atmosphere and plasma is generated in the vicinity of the substrate so that a substrate surface is modified. Note that instead of an argon atmosphere, a nitrogen atmosphere, a helium atmosphere, an oxygen atmosphere, or the like may be used.

As the oxide semiconductor film 330, a four-component metal oxide film such as an In—Sn—Ga—Zn—O film; a three-component metal oxide film such as an In—Ga—Zn—O film, an In—Sn—Zn—O film, an In—Al—Zn—O film, a Sn—Ga—Zn—O film, an Al—Ga—Zn—O film, or a Sn—Al—Zn—O film; or a two-component metal oxide film such as an In—Zn—O film, a Sn—Zn—O film, an Al—Zn—O film, a Zn—Mg—O film, a Sn—Mg—O film, or an In—Mg—O film; or a single-component metal oxide film such as an In—O film, a Sn—O film, or a Zn—O film can be used. In addition, the above oxide semiconductor film may contain $SiO_2$. In this embodiment, the oxide semiconductor film 330 is deposited by a sputtering method with the use of an In—Ga—Zn—O-based oxide target. A cross-sectional view at this stage corresponds to FIG. 6A. In addition, the oxide semiconductor film 330 can be formed by a sputtering method in a rare gas (typically, argon) atmosphere, an oxygen atmosphere, or an atmosphere containing a rare gas (typically, argon) and oxygen.

As a target for forming the oxide semiconductor film 330 by a puttering method, for example, a target having a composition ratio of $In_2O_3$:$Ga_2O_3$:ZnO=1:1:1 [molar ratio] or the like can be used. Alternatively, a target having a composition ratio of $In_2O_3$:$Ga_2O_3$:ZnO=1:1:2 [molar ratio] or a target having a composition ratio of $In_2O_3$:$Ga_2O_3$:ZnO=1:1:4 [molar ratio] may be used. The filling rate of the oxide target is greater than or equal to 90% and less than or equal to 100%, preferably greater than or equal to 95% and less than or equal to 99.9%. With the use of the oxide target with high filling rate, the deposited oxide semiconductor film 330 is dense.

As a sputtering gas used for forming the oxide semiconductor film 330, a high-purity gas is preferably used, in which an impurity such as hydrogen, water, hydroxy group, or hydride is removed so that the concentration is approximately several parts per million or approximately several parts per billion.

The substrate is held in a treatment chamber kept under reduced pressure, and the substrate temperature is set to higher than or equal to 100° C. and lower than or equal to 600° C., preferably higher than or equal to 200° C. and lower than or equal to 400° C. By heating the substrate during deposition, the concentration of an impurity contained in the deposited oxide semiconductor film 330 can be reduced. In addition, damage by sputtering can be reduced. Then, a sputtering gas from which hydrogen and moisture are removed is introduced while remaining moisture in the treatment chamber is removed, and the above-described target is used, so that the oxide semiconductor film 330 is formed over the substrate 305. In order to remove remaining moisture in the treatment chamber, an entrapment vacuum pump is preferably used. For example, a cryopump, an ion pump, or a titanium sublimation pump is preferably used. The evacuation unit may be a turbo pump provided with a cold trap. In the film formation chamber which is evacuated with the cryopump, for example, a hydrogen atom, a compound containing a hydrogen atom, such as water ($H_2O$), (more preferably, also a compound containing a carbon atom), and the like are evacuated, whereby the concentration of an impurity contained in the oxide semiconductor film 330 deposited in the film formation chamber can be reduced.

As one example of the deposition condition, the distance between the substrate and the target is 100 mm, the pressure is 0.6 Pa, the direct-current (DC) power source is 0.5 kW, and the atmosphere is an oxygen atmosphere (the flow rate of oxygen is 100%). Note that a pulse direct current (DC) power source is preferable because powdery substances (also referred to as particles or dust) generated in film formation can be reduced and the film thickness can be uniform. Since appropriate thickness depends on an oxide semiconductor material used, the thickness may be determined as appropriate depending on the material.

Then, by a second photolithography step, the oxide semiconductor film 330 is processed into an island-shaped oxide semiconductor layer. A resist mask for forming the island-shaped oxide semiconductor layer may be formed by an ink-jet method. Formation of the resist mask by an ink-jet method needs no photomask; thus, manufacturing cost can be reduced.

In the case where a contact hole is formed in the gate insulating layer 307, a step of forming the contact hole can be performed at the same time as processing of the oxide semiconductor film 330.

Note that etching of the oxide semiconductor film 330 performed at this time may be dry etching, wet etching, or both dry etching and wet etching.

As an etching gas for dry etching, a gas containing chlorine (a chlorine-based gas such as chlorine ($Cl_2$), boron trichloride ($BCl_3$), silicon tetrachloride ($SiCl_4$), or carbon tetrachloride ($CCl_4$)) is preferably used.

Alternatively, a gas containing fluorine (a fluorine-based gas such as carbon tetrafluoride ($CF_4$), sulfur hexafluoride ($SF_6$), nitrogen trifluoride ($NF_3$), or trifluoromethane ($CHF_3$)); hydrogen bromide (HBr); oxygen ($O_2$); any of these gases to which a rare gas such as helium (He) or argon (Ar) is added; or the like can be used.

As the dry etching method, a parallel plate reactive ion etching (RIE) method or an inductively coupled plasma (ICP) etching method can be used. In order to etch the film into a desired shape, the etching condition (the amount of electric power applied to a coil-shaped electrode, the amount of electric power applied to an electrode on a substrate side, the temperature of the electrode on the substrate side, or the like) is adjusted as appropriate.

As an etchant used for wet etching, a mixed solution of phosphoric acid, acetic acid, and nitric acid, or the like can be used. In addition, ITO07N (produced by KANTO CHEMICAL CO., INC.) may also be used.

The etchant after the wet etching is removed together with the etched materials by cleaning. The waste liquid containing the etchant and the material etched off may be purified and the material may be reused. When a material such as indium contained in the oxide semiconductor film is collected from the waste liquid after the etching and reused, the resources can be efficiently used and the cost can be reduced.

The etching conditions (such as an etchant, etching time, and a temperature) are appropriately adjusted depending on the material so that the material can be etched into a desired shape.

Next, the oxide semiconductor layer is subjected to first heat treatment. By the first heat treatment, the oxide semiconductor layer can be dehydrated or dehydrogenated. The temperature of the first heat treatment is higher than or equal to 400° C. and lower than or equal to 750° C., preferably higher than or equal to 400° C. and lower than the strain point of the substrate. In this embodiment, the substrate is introduced into an electric furnace which is a kind of heat treatment apparatus, and heat treatment is performed for 1 hour at 450° C. on the oxide semiconductor layer in a nitrogen atmosphere. After that, the oxide semiconductor layer is prevented from being exposed to the air, whereby water or hydrogen is prevented from entering the oxide semiconductor layer; thus, the oxide semiconductor layer 331 is obtained (see FIG. 6B).

Note that a heat treatment apparatus is not limited to an electrical furnace, and may be provided with a device for heating an object to be processed by heat conduction or heat radiation from a heating element such as a resistance heating element. For example, a rapid thermal annealing (RTA) apparatus such as a lamp rapid thermal annealing (LRTA) apparatus or a gas rapid thermal annealing (GRTA) apparatus can be used. An LRTA apparatus is an apparatus for heating an object to be processed by radiation of light (an electromagnetic wave) emitted from a lamp such as a halogen lamp, a metal halide lamp, a xenon arc lamp, a carbon arc lamp, a high pressure sodium lamp, or a high pressure mercury lamp. A GRTA apparatus is an apparatus for heat treatment using a high-temperature gas. As the gas, an inert gas which does not react with an object to be processed by heat treatment, such as nitrogen or a rare gas such as argon is used.

For example, as the first heat treatment, GRTA in which the substrate is moved into an inert gas heated to a high temperature as high as 650° C. to 700° C., heated for several minutes, and moved out of the inert gas heated to the high temperature may be performed. GRTA enables high-temperature heat treatment to be performed in a short time.

Note that in the first heat treatment, it is preferable that water, hydrogen, and the like be not contained in the atmosphere of nitrogen or a rare gas such as helium, neon, or argon. It is preferable that the purity of nitrogen or the rare gas such as helium, neon, or argon which is introduced into the heat treatment apparatus be set to be greater than or equal to 6 N (99.9999%), more preferably greater than or equal to 7 N (99.99999%) (that is, the impurity concentration is lower than or equal to 1 ppm, preferably lower than or equal to 0.1 ppm).

Further, the oxide semiconductor layer may be heated as the heat treatment for dehydration or dehydrogenation and then cooled by introducing a high-purity oxygen gas, a high-purity $N_2O$ gas, or ultra-dry air (having a dew point lower than or equal to −40° C., preferably lower than or equal to −60° C.) in the same furnace. It is preferable that the oxygen gas and the $N_2O$ gas do not contain water, hydrogen, and the like. Alternatively, the purity of an oxygen gas or an $N_2O$ gas which is introduced into the heat treatment apparatus is preferably greater than or equal to 6 N (99.9999%), more preferably greater than or equal to 7 N (99.99999%) (that is, the impurity concentration in the oxygen gas or the $N_2O$ gas is lower than or equal to 1 ppm, preferably lower than or equal to 0.1 ppm). By supplying oxygen, which is a main component included in the oxide semiconductor but has been reduced through the step of eliminating an impurity by dehydration treatment or dehydrogenation treatment, the oxide semiconductor layer is highly purified and made to be electrically an i-type (intrinsic) semiconductor.

The first heat treatment of the oxide semiconductor layer can also be performed on the oxide semiconductor film 330 before being processed into the island-shaped oxide semiconductor layer. In that case, the substrate is taken out from the heat apparatus after the first heat treatment, and then a photolithography step is performed.

The heat treatment having an effect of dehydration or dehydrogenation on the oxide semiconductor layer may be performed at any of the following timings: after the oxide semiconductor layer is formed; after the source electrode layer and the drain electrode layer are formed over the oxide semiconductor layer; and after the insulating layer is formed over the source electrode layer and the drain electrode layer. Further, the number of times of the heat treatment is not limited.

In the case where a contact hole is formed in the gate insulating layer 307, the step may be performed either before or after dehydration or dehydrogenation of the oxide semiconductor film 330.

Next, a conductive film to be the source and drain electrode layers (including a wiring formed in the same layer as the source and drain electrode layers) is formed over the gate insulating layer 307 and the oxide semiconductor layer 331. The conductive film may be formed by a sputtering method or a vacuum evaporation method. As a material of the conductive film to be the source and drain electrode layers (including a wiring formed in the same layer as the source and drain electrode layers), an element selected from aluminum (Al), chromium (Cr), copper (Cu), tantalum (Ta), titanium (Ti), molybdenum (Mo), and tungsten (W), an alloy containing any of these elements as a component, an alloy film in which any of these elements are combined, or the like can be used. Alternatively, a structure may be employed in which a layer of a high-melting-point metal such as chromium (Cr), tantalum (Ta), titanium (Ti), molybdenum (Mo), or tungsten (W) is stacked over and/or below a metal layer of aluminum (Al) or copper (Cu). Furthermore, in the case of using an aluminum (Al) material to which an element preventing generation of hillocks or whiskers in an aluminum (Al) film such as silicon (Si), titanium (Ti), tantalum (Ta), tungsten (W), molybdenum (Mo), chromium (Cr), neodymium (Nd), scandium (Sc), or yttrium (Y) is added, heat resistance can be improved.

Further, the conductive film may have a single-layer structure or a stacked-layer structure using two or more layers. For example, a single-layer structure of an aluminum film containing silicon, a two-layer structure in which a titanium film is stacked over an aluminum film, a three-layer structure in which a titanium (Ti) film, an aluminum film, and a titanium (Ti) film are stacked in the order presented, and the like can be given.

Alternatively, the conductive film may be formed using conductive metal oxide. As conductive metal oxide, indium oxide ($In_2O_3$), tin oxide ($SnO_2$), zinc oxide (ZnO), an alloy of indium oxide and tin oxide ($In_2O_3$—$SnO_2$, abbreviated to ITO), an alloy of indium oxide and zinc oxide ($In_2O_3$—ZnO), or the metal oxide material to which silicon or silicon oxide is added can be used.

In the case where heat treatment is performed after the conductive film is formed, it is preferable that the conductive film have heat resistance high enough to withstand the heat treatment.

A third photolithography step is performed. A resist mask is formed over the conductive film and selective etching is performed, so that the source electrode layer 315*a* and the drain electrode layer 315*b* are formed. Then, the resist mask is removed (see FIG. 6C).

Ultraviolet light, KrF laser light, or ArF laser light is preferably used for light exposure for forming the resist mask in the third photolithography step. A channel length L of the transistor that is completed later is determined by a distance between bottom ends of the source electrode layer and the drain electrode layer, which are adjacent to each other over the oxide semiconductor layer 331. In the case where the channel length L is less than 25 nm, the light exposure at the time of the formation of the resist mask in the third photolithography step may be performed using extreme ultraviolet light having an extremely short wavelength of several nanometers to several tens of nanometers. Light exposure with extreme ultraviolet light leads to a high resolution and a large depth of focus. Thus, the channel length L of the transistor to be completed later can be greater than or equal to 10 nm and less than or equal to 1000 nm and the operation speed of a circuit can be increased, and furthermore the off state current is extremely small, and thus lower power consumption can be achieved.

Note that, in the third photolithography step for etching the conductive film, only part of the oxide semiconductor layer 331 may be etched, whereby an oxide semiconductor layer having a groove (a depressed portion) is formed in some cases. A material of each component and etching conditions are appropriately adjusted so that the oxide semiconductor layer 331 is not removed.

In this embodiment, since a titanium (Ti) film is used as the conductive film and the In—Ga—Zn—O-based oxide semiconductor is used for the oxide semiconductor layer 331, an ammonium hydrogen peroxide mixture (a 31 wt. % hydrogen peroxide solution: 28 wt. % ammonia water: water=5:2:2) is used as an etchant.

Note that the resist mask used for forming the source electrode layer 315*a* and the drain electrode layer 315*b* may be formed by an ink-jet method. Formation of the resist mask by an ink-jet method needs no photomask; thus, manufacturing cost can be reduced.

In order to reduce the number of photomasks used in a photolithography step and reduce the number of photolithography steps, an etching step may be performed with the use of a resist mask formed using a multi-tone mask which is a light-exposure mask through which light is transmitted to have a plurality of intensities. A resist mask formed with the use of a multi-tone mask has a plurality of thicknesses and further can be changed in shape by etching; therefore, the resist mask can be used in a plurality of etching steps for processing into different patterns. Therefore, a resist mask corresponding to at least two kinds of different patterns can be formed by using a multi-tone mask. Thus, the number of light-exposure masks can be reduced and the number of corresponding photolithography steps can be also reduced, whereby simplification of a process can be realized.

After that, water adsorbed to a surface of an exposed part of the oxide semiconductor layer may be removed by performing plasma treatment using a gas such as $N_2O$, $N_2$, or Ar.

In the case where the plasma treatment is performed, the insulating layer 316 which serves as a protective insulating film in contact with part of the oxide semiconductor layer is formed without exposure to the air.

The insulating layer 316 has a thickness of at least 1 nm and can be formed by a method by which an impurity such as water or hydrogen does not enter the insulating layer 316, such as a sputtering method, as appropriate. When hydrogen is contained in the insulating layer 316, entry of the hydrogen to the oxide semiconductor layer, or extraction of oxygen in the oxide semiconductor layer by the hydrogen is caused, thereby making the backchannel of the oxide semiconductor layer have lower resistance (be n-type), so that a parasitic channel may be formed. Therefore, it is important that a formation method in which hydrogen is not used is employed such that the insulating layer 316 contains as little hydrogen as possible.

In this embodiment, a silicon oxide film is formed to a thickness of 200 nm as the insulating layer 316 by a sputtering method. The substrate temperature in film formation may be higher than or equal to room temperature and lower than or equal to 300° C. and in this embodiment, is 100° C. Formation of a silicon oxide film by a sputtering method can be performed in a rare gas (typically, argon) atmosphere, an oxygen atmosphere, or an atmosphere of a rare gas (typically, argon) and oxygen. As a target, a silicon oxide target or a silicon target can be used. For example, a silicon oxide film can be formed by a sputtering method in an atmosphere of oxygen and nitrogen using a silicon target. The insulating layer 316 which is formed in contact with the oxide semiconductor layer is formed using an inorganic insulating film that does not contain an impurity such as moisture, a hydrogen ion, or $OH^-$ and blocks entry of such an impurity from the outside. Typically, a silicon oxide film, a silicon oxynitride film, an aluminum oxide film, or an aluminum oxynitride film is used.

In that case, the insulating layer 316 is preferably formed while remaining moisture in the treatment chamber is removed. This is for preventing hydrogen, hydroxy group, and moisture from being contained in the oxide semiconductor layer 331 and the insulating layer 316.

In order to remove remaining moisture in the treatment chamber, an entrapment vacuum pump is preferably used. For example, a cryopump, an ion pump, or a titanium sublimation pump is preferably used. The evacuation unit may be a turbo pump provided with a cold trap. In the film formation chamber which is evacuated with the cryopump, for example, a hydrogen atom, a compound containing a hydrogen atom, such as water ($H_2O$), and the like are evacuated, whereby the concentration of an impurity contained in the insulating layer 316 deposited in the film formation chamber can be reduced.

As a sputtering gas used for forming the insulating layer 316, a high-purity gas is preferably used, in which an impurity such as hydrogen, water, hydroxy group, or hydride is removed so that the concentration is approximately several parts per million or approximately several parts per billion.

Next, second heat treatment is performed in an inert gas atmosphere or oxygen gas atmosphere (preferably at a temperature higher than or equal to 200° C. and lower than or equal to 400° C., e.g. a temperature higher than or equal to 250° C. and lower than or equal to 350° C.). For example, the second heat treatment is performed in a nitrogen atmosphere at 250° C. for 1 hour. By the second heat treatment, heat is applied in the state where part of the oxide semiconductor layer 331 (the channel formation region) is in contact with the insulating layer 316.

Through the above steps, the oxide semiconductor film after being deposited can be dehydrated or dehydrogenated by heat treatment. Thus, an impurity such as hydrogen, moisture, hydroxy group, or hydride (also referred to as a hydrogen compound) can be intentionally removed from the oxide semiconductor layer and oxygen, which is a main component included in the oxide semiconductor but has been reduced through the step of eliminating an impurity by dehydration treatment or dehydrogenation treatment can be supplied. Therefore, the oxide semiconductor layer is highly purified and is made to be an electrically i-type (intrinsic) semiconductor.

In the case where heat treatment for dehydration or dehydrogenation is performed in an inert gas atmosphere such as nitrogen or a rare gas, in particular, an oxide semiconductor layer is changed into an n-type low-resistance oxide semiconductor layer after the heat treatment due to oxygen deficiency; however, by providing the insulating layer 316 in contact with the oxide semiconductor layer 331 and performing heating like this embodiment, part of the oxide semiconductor layer 331 which is in contact with the insulating layer 316 can be selectively supplied with oxygen. The part is made to be an i-type semiconductor and is favorable to be used as a channel formation region. In this case, a region of the oxide semiconductor layer 331 which is not in direct contact with the insulating layer 316 and overlaps with the source electrode layer 315*a* or the drain electrode layer 315*b* remains to be n-type; thus, a high-resistance source region and a high-resistance drain region are formed in a self-aligned manner. By employing the above structure, the high-resistance drain region serves as a buffer and a high electric field is not applied locally even if a high electric field is applied between the gate electrode layer 311 and the drain electrode layer 315*b*, so that the withstand voltage of the transistor can be improved.

Figure 6D:
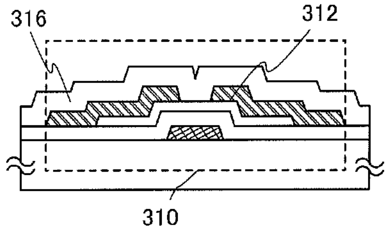
Figure 6E:
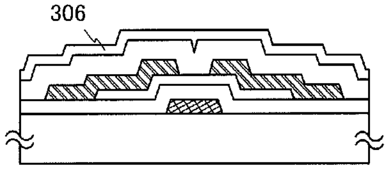

Through the above-described steps, the transistor 310 is formed (see FIG. 6D).

When a silicon oxide layer having a lot of defects is used as the insulating layer 316, the heat treatment after formation of the silicon oxide layer has an effect of diffusing an impurity such as hydrogen, moisture, hydroxy group, or hydride contained in the oxide semiconductor layer to the insulating layer 316 so that the impurity contained in the oxide semiconductor layer can be further reduced.

A protective insulating layer may be additionally formed over the insulating layer 316. For example, a silicon nitride film is formed by an RF sputtering method. Since an RF sputtering method has high productivity, it is preferably used as a film formation method of the protective insulating layer. The protective insulating layer is formed using an inorganic insulating film which does not contain an impurity such as hydrogen, moisture, hydroxy group, or hydride and blocks entry of such an impurity from the outside and a silicon nitride film, an aluminum nitride film, a silicon nitride oxide film, an aluminum nitride oxide film, or the like is used. In this embodiment, as the protective insulating layer, a protective insulating layer 306 is formed using a silicon nitride film (see FIG. 6E).

As the protective insulating layer 306 in this embodiment, a silicon nitride film is formed by heating the substrate 305, over which the gate electrode layer 311, the gate insulating layer 307, the oxide semiconductor layer 331, the source electrode layer 315*a*, the drain electrode layer 315*b*, and the insulating layer 316 are formed, to a temperature of 100° C. to 400° C., introducing a sputtering gas containing high-purity nitrogen from which hydrogen and moisture are removed, and using a target of a silicon semiconductor. Also in that case, similarly to the case of the insulating layer 316, the protective insulating layer 306 is preferably formed while remaining moisture in the treatment chamber is removed.

After the formation of the protective insulating layer, heat treatment may be further performed at a temperature higher than or equal to 100° C. and lower than or equal to 200° C. in the air for greater than or equal to 1 hour and less than or equal to 30 hours. This heat treatment may be performed at a fixed heating temperature. Alternatively, the following change in the heating temperature may be conducted plural times repeatedly: the heating temperature is increased from room temperature to a temperature higher than or equal to 100° C. and lower than or equal to 200° C. and then decreased to room temperature. This heat treatment may be performed under a reduced pressure before the formation of the insulating layer 316. Under the reduced pressure, the heat treatment time can be shortened.

Note that a planarization insulating layer for planarization may be provided over the protective insulating layer 306.

As described above, by using a transistor including a highly purified oxide semiconductor layer which is formed using this embodiment, a highly-functional display device with high reliability in which power consumption is further reduced can be provided.

This embodiment can be implemented combining with another embodiment as appropriate.

[Embodiment 4]

By using the transistor, an example of which is described in Embodiment 2 or 3, in a pixel portion and a driver circuit, the display device described in Embodiment 1 (a semiconductor device having a display function) can be manufactured. Moreover, part or all of the driver circuits which include the transistor can be formed over the substrate where the pixel portion is formed, whereby a system-on-panel can be obtained.

The display device described in Embodiment 1 includes a display element. As the display element, a liquid crystal element (also referred to as a liquid crystal display element) or a light-emitting element (also referred to as a light-emitting display element) can be used. The light-emitting element includes, in its category, an element whose luminance is controlled by current or voltage, and specifically includes, in its category, an inorganic electroluminescent (EL) element, an organic EL element, and the like. Furthermore, a display medium whose contrast is changed by an electric effect, such as electronic ink, can be used.

In addition, the display device includes a panel in which the display element is sealed, and a module in which an IC including a controller or the like is mounted on the panel.

Note that a display device in this specification means an image display device, a display device, or a light source (including a lighting device). Furthermore, the display device also includes the following modules in its category: a module to which a connector such as an FPC, a TAB tape, or a TCP is attached; a module having a TAB tape or a TCP at the tip of which a printed wiring board is provided; and a module in which an integrated circuit (IC) is directly mounted on a display element by a COG method.

As a display panel which is one mode of the display device, for example, a display panel in which a transistor and a display element are sealed with a sealant between a first substrate and a second substrate can be given.

Specifically, the sealant is provided so as to surround a pixel portion and a scan line driver circuit which are provided over the first substrate, and the second substrate is provided over the pixel portion and the scan line driver circuit. In this manner, the pixel portion, the scan line driver circuit, and the display element can be sealed with the first substrate, the sealant, and the second substrate. A signal line driver circuit that is formed using a single crystal semiconductor film or a polycrystalline semiconductor film over a substrate separately prepared can be mounted in a region that is different from the region surrounded by the sealant over the first substrate.

Note that there is no particular limitation on the connection method of a driver circuit which is separately formed, and a COG method, a wire bonding method, a TAB method, or the like can be used.

Further, the pixel portion and the scan line driver circuit which are provided over the first substrate include a plurality of transistors and the transistor which is described in Embodiment 2 or 3 can be used as one of the transistors.

In the case where a liquid crystal element is used as the display element, a thermotropic liquid crystal, a low-molecular liquid crystal, a high-molecular liquid crystal, a polymer dispersed liquid crystal, a ferroelectric liquid crystal, an antiferroelectric liquid crystal, or the like is used. Such a liquid crystal material exhibits a cholesteric phase, a smectic phase, a cubic phase, a chiral nematic phase, an isotropic phase, or the like depending on conditions.

Alternatively, liquid crystal exhibiting a blue phase for which an alignment film is unnecessary may be used. A blue phase is one of liquid crystal phases, which appears just before a cholesteric phase changes into an isotropic phase while a temperature of cholesteric liquid crystal is increased. Since the blue phase appears only in a narrow temperature range, a liquid crystal composition in which greater than or equal to 5 wt. % of a chiral material is mixed is used for the liquid crystal layer in order to improve the temperature range. The liquid crystal composition which includes a liquid crystal exhibiting a blue phase and a chiral agent has a short response time less than or equal to 1 msec, has optical isotropy, which makes the alignment process unneeded, and has a small viewing angle dependence. In addition, since an alignment film does not need to be provided and rubbing treatment is unnecessary, electrostatic discharge damage caused by the rubbing treatment can be prevented and defects and damage of a liquid crystal display device can be reduced in the manufacturing process. Thus, productivity of the liquid crystal display device can be increased. The transistor including the oxide semiconductor layer which is described in Embodiment 3 particularly has a possibility that electrical characteristics of the transistor may significantly change and deviate from the designed range by the influence of static electricity. Therefore, it is more effective to use a blue phase liquid crystal material for a liquid crystal display device including a transistor formed using an oxide semiconductor layer.

The specific resistivity of the liquid crystal material is greater than or equal to $1\times10^{9}\Omega\cdot$cm, preferably greater than or equal to $1\times10^{11}\Omega\cdot$cm, more preferably greater than or equal to $1\times10^{12}\Omega\cdot$cm. Note that the specific resistivity in this specification is measured at 20° C.

The size of storage capacitor formed in the liquid crystal display device is set considering the leakage current of the transistor provided in the pixel portion or the like so that charge can be held for a predetermined period. The size of the storage capacitor may be set considering the off state current of the transistor or the like. By using the transistor including the high-purity oxide semiconductor layer which is described in Embodiment 3, a storage capacitor having capacitance which is less than or equal to ⅓, preferably less than or equal to ⅕ with respect to a liquid crystal capacitance of each pixel is sufficient to be provided.

Note that, as described in Embodiment 1, a refresh operation may be performed as appropriate also in a still image region, depending on the holding rate of the voltage applied to the liquid crystal element during the holding period. For example, a refresh operation may be performed at the timing when voltage is decreased to a predetermined level from the value (initial value) of voltage shortly after a signal is written to a pixel electrode of the liquid crystal element. The predetermined level is preferably set to voltage at which flicker is not sensed with respect to the initial value. Specifically, it is preferable to perform the refresh operation (rewriting) every time the voltage reaches voltage which is less than the initial value by 10%, far preferably 3%.

As the specific resistivity of the liquid crystal material becomes larger, more charge leaking through the liquid crystal material can be reduced, and decrease over time in voltage for holding an operation state of the liquid crystal element can be suppressed. As a result, the holding period can be extended; therefore, the frequency of refresh operations in the still image region can be reduced, and power consumption of the display device can be reduced.

For the liquid crystal display device, a twisted nematic (TN) mode, an in-plane-switching (IPS) mode, a fringe field switching (FFS) mode, an axially symmetric aligned micro-cell (ASM) mode, an optical compensated birefringence (OCB) mode, a ferroelectric liquid crystal (FLC) mode, an antiferroelectric liquid crystal (AFLC) mode, or the like is used.

In addition, the liquid crystal display device may be a normally black liquid crystal display device such as a transmissive liquid crystal display device utilizing a vertical alignment (VA) mode. A VA liquid crystal display device is one type of form in which alignment of liquid crystal molecules of a liquid crystal display panel is controlled. In the VA liquid crystal display device, liquid crystal molecules are aligned in a vertical direction with respect to a panel surface when no voltage is applied. There are some examples of a vertical alignment mode; for example, a multi-domain vertical alignment (MVA) mode, a patterned vertical alignment (PVA) mode, an ASV mode, or the like can be employed. Moreover, it is possible to use a method called domain multiplication or multi-domain design, in which a pixel is divided into some regions (subpixels) and molecules are aligned in different directions in their respective regions.

Further, in the display device, a black matrix (a light-shielding layer), an optical member (an optical substrate) such as a polarizing member, a retardation member, or an anti-reflection member, and the like are provided as appropriate. For example, circular polarization may be obtained by using a polarizing substrate and a retardation substrate. In addition, a backlight, a side light, or the like may be used as a light source.

As a display method in the pixel portion, a progressive method, an interlace method or the like can be employed. Further, color components controlled in the pixel at the time of color display are not limited to three colors of R, G, and B (R, G, and B correspond to red, green, and blue, respectively); for example, R, G B, and W (W corresponds to white), or R, G, B, and one or more of yellow, cyan, magenta, and the like can be employed. Further, the sizes of display regions may be different between respective dots of color elements. The present invention is not limited to the application to a display device for color display but can also be applied to a display device for monochrome display.

Alternatively, as the display element included in the display device, a light-emitting element utilizing electroluminescence can be used. Light-emitting elements utilizing electroluminescence are classified according to whether a light-emitting material is an organic compound or an inorganic compound. In general, the former is referred to as an organic EL element, and the latter is referred to as an inorganic EL element.

In an organic EL element, by application of voltage to a light-emitting element, electrons and holes are separately injected from a pair of electrodes into a layer containing a light-emitting organic compound, and current flows. The carriers (electrons and holes) are recombined, and thus, the light-emitting organic compound is excited. The light-emitting organic compound returns to a ground state from the excited state, thereby emitting light. Owing to such a mechanism, this light-emitting element is referred to as a current-excitation light-emitting element.

The inorganic EL elements are classified according to their element structures into a dispersion-type inorganic EL element and a thin-film inorganic EL element. A dispersion-type inorganic EL element has a light-emitting layer where particles of a light-emitting material are dispersed in a binder, and its light emission mechanism is donor-acceptor recombination type light emission that utilizes a donor level and an acceptor level. A thin-film inorganic EL element has a structure where a light-emitting layer is sandwiched between dielectric layers, which are further sandwiched between electrodes, and its light emission mechanism is localized type light emission that utilizes inner-shell electron transition of metal ions.

Note that, as described in Embodiment 1, a refresh operation may be performed as appropriate also in a still image region, depending on the holding rate of the voltage applied to a gate of the driving transistor which is connected to the EL element during the holding period. For example, a refresh operation may be performed at the timing when voltage is decreased to a predetermined level from the value (initial value) of voltage shortly after a signal is written to the gate of the driving transistor. The predetermined level is preferably set to voltage at which flicker is not sensed with respect to the initial value. Specifically, it is preferable to perform the refresh operation (rewriting) every time the voltage reaches voltage which is less than the initial value by 10%, far preferably 3%.

The driving method of a display device which is described in Embodiment 1 can be applied to electronic paper in which electronic ink is driven. The electronic paper is also referred to as an electrophoretic display device (an electrophoretic display) and is advantageous in that it has the same level of readability as plain paper, it has lower power consumption than other display devices, and it can be made thin and lightweight.

Electrophoretic display devices can have various modes. Electrophoretic display devices contain a plurality of microcapsules dispersed in a solvent or a solute, each microcapsule containing first particles which are positively charged and second particles which are negatively charged. By applying an electric field to the microcapsules, the particles in the microcapsules move in opposite directions to each other and only the color of the particles gathering on one side is displayed. Note that the first particles and the second particles each contain pigment and do not move without an electric field. Moreover, the first particles and the second particles have different colors (which may be colorless).

Thus, an electrophoretic display device is a display that utilizes a so-called dielectrophoretic effect by which a substance having a high dielectric constant moves to a high-electric field region.

A solution in which the above microcapsules are dispersed in a solvent is referred to as electronic ink. This electronic ink can be printed on a surface of glass, plastic, cloth, paper, or the like. Furthermore, by using a color filter or particles that have a pigment, color display can also be achieved.

Note that the first particles and the second particles in the microcapsules may be formed using a single material selected from a conductive material, an insulating material, a semiconductor material, a magnetic material, a liquid crystal material, a ferroelectric material, an electroluminescent material, an electrochromic material, and a magnetophoretic material, or formed using a composite material of any of these materials.

Further, as the electronic paper, a display device in which a twisting ball display system is employed can be used. The twisting ball display system refers to a method in which spherical particles each colored in black and white are arranged between a first electrode layer and a second electrode layer which are electrode layers used for a display element, and a potential difference is generated between the first electrode layer and the second electrode layer to control orientation of the spherical particles, so that display is performed.

By applying the driving method described in Embodiment 1 to the display device examples of which are described above, a display device in which power consumption is reduced can be provided.

This embodiment can be implemented combining with another embodiment as appropriate.

[Embodiment 5]

A display device disclosed in this specification can be applied to a variety of electronic appliances (including game machines). Examples of electronic appliances are a television set (also referred to as a television or a television receiver), a monitor of a computer or the like, a camera such as a digital camera or a digital video camera, a digital photo frame, a mobile phone handset (also referred to as a mobile phone or a mobile phone device), a portable game console, a portable information terminal, an audio reproducing device, a large-sized game machine such as a pachinko machine, and the like.

Figure 7A:
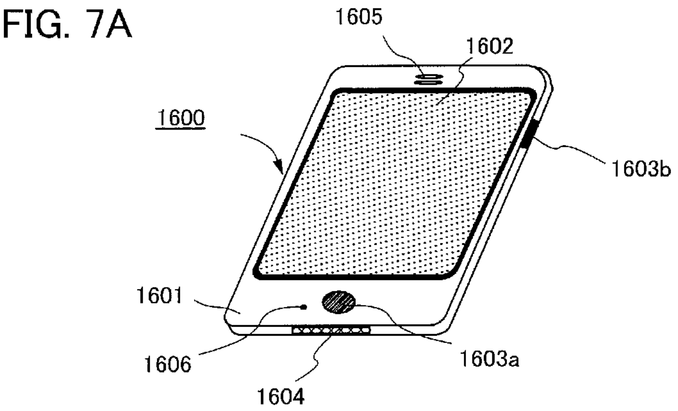
FIGS. 7A and 7B are diagrams each illustrating an electronic appliance.

FIG. 7A illustrates an example of a mobile phone. A mobile phone 1600 is provided with a display portion 1602 incorporated in a housing 1601, operation buttons 1603*a* and 1603*b*, an external connection port 1604, a speaker 1605, a microphone 1606, and the like.

When the display portion 1602 of the mobile phone 1600 illustrated in FIG. 7A is touched with a finger or the like, data can be input to the mobile phone 1600. Users can make a call or compose a mail by touching the display portion 1602 with their fingers or the like.

There are mainly three screen modes of the display portion 1602. The first mode is a display mode mainly for displaying images. The second mode is an input mode mainly for inputting data such as text. The third mode is a display-and-input mode in which two modes of the display mode and the input mode are combined.

For example, in the case of making a call or composing a mail, a text input mode mainly for inputting text is selected in the display portion 1602 so that text displayed on a screen can be input. In this case, it is preferable to display a keyboard or number buttons on almost all area of the screen of the display portion 1602.

When a detection device including a sensor for detecting inclination, such as a gyroscope or an acceleration sensor, is provided inside the mobile phone 1600, display of the screen of the display portion 1602 can be automatically switched by determining the direction of the mobile phone 1600 (whether the mobile phone 1600 is placed horizontally or vertically for a landscape mode or a portrait mode).

The screen modes are switched through an operation by touching the display portion 1602 or by operating the operation buttons 1603*a* and 1603*b* of the housing 1601. Alternatively, the screen modes may be switched depending on the kind of the image displayed on the display portion 1602. For example, when a signal of an image displayed on the display portion 1602 is a signal of moving image data, the screen mode is switched to the display mode. When the signal is a text data, the screen mode is switched to the input mode.

Further, in the input mode, when input by touching the display portion 1602 is not performed for a certain period while a signal detected by an optical sensor in the display portion 1602 is detected, the screen mode may be controlled so as to be switched from the input mode to the display mode.

The display portion 1602 may function as an image sensor. For example, an image of the palm print, the fingerprint, or the like is taken by touching the display portion 1602 with the palm or the finger, whereby personal authentication can be performed. Further, by providing a backlight or a sensing light source which emits a near-infrared light in the display portion, an image of a finger vein, a palm vein, or the like can be taken.

The display device described in Embodiment 1 can be applied to the display portion 1602. By applying the display device described in Embodiment 1 to the display portion 1602, power consumption of the mobile phone can be reduced.

Figure 7B:
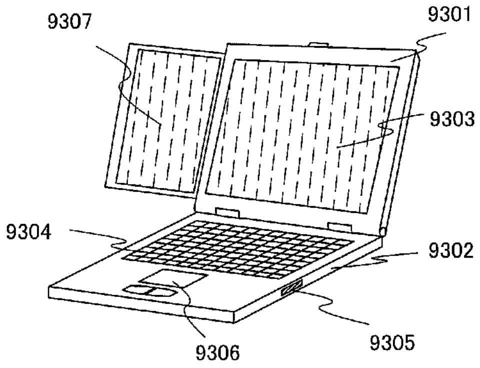

FIG. 7B is a perspective view illustrating an example of a portable computer.

In the portable computer illustrated in FIG. 7B, a top housing 9301 having a display portion 9303 and a bottom housing 9302 having a keyboard 9304 can overlap with each other by closing a hinge unit which connects the top housing 9301 and the bottom housing 9302. Since the portable computer can be opened and closed with the hinge unit, the portable computer is convenient for carrying, and in the case of using the keyboard for input, the hinge unit is opened and the user can input data looking at the display portion 9303.

The bottom housing 9302 includes a pointing device 9306 with which input can be performed, in addition to the keyboard 9304. Further, when the display portion 9303 is a touch input panel, input can be performed by touching part of the display portion. The bottom housing 9302 includes an arithmetic function portion such as a CPU or a hard disk. In addition, the bottom housing 9302 includes an external connection port 9305 into which another device such as a communication cable conformable to communication standards of a USB is inserted.

The top housing 9301 may further include a display portion 9307 which can be kept in the top housing 9301 by being slid therein, in which case a large display screen can be realized. In addition, the user can adjust the orientation of a screen of the display portion 9307 which can be kept in the top housing 9301. When the display portion 9307 which can be kept in the top housing 9301 is a touch input panel, input can be performed by touching part of the display portion 9307 which can be kept in the top housing 9301.

The display device described in Embodiment 1 can be applied to the display portion 9303 or the display portion 9307 which can be kept in the top housing 9301. By applying the display device described in Embodiment 1 to the display portion 9303 or the display portion 9307 which can be kept in the top housing 9301, power consumption of the portable computer can be reduced.

In addition, the portable computer in FIG. 7B can be provided with a receiver and the like and can receive a television broadcast to display an image on the display portion 9303 or the display portion 9307 which can be kept in the top housing 9301. While the hinge unit which connects the top housing 9301 and the bottom housing 9302 is kept closed, the whole screen of the display portion 9307 which can be kept in the top housing 9301 is exposed by sliding the display portion 9307 which can be kept in the top housing 9301 out and the angle of the screen is adjusted; thus, the user can watch a television broadcast. In this case, the hinge unit is not opened and display is not performed on the display portion 9303. In addition, start up of only a circuit for displaying television broadcast is performed. Therefore, power can be consumed to the minimum, which is useful for the portable computer whose battery capacity is limited.

Figure 8A:
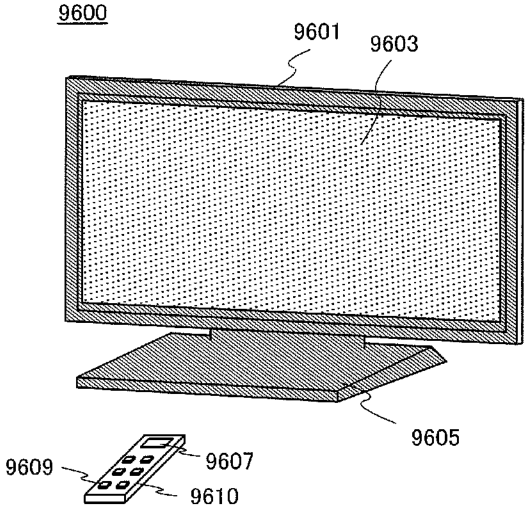
FIGS. 8A and 8B are diagrams each illustrating an electronic appliance.

FIG. 8A illustrates an example of a television set. In a television set 9600, a display portion 9603 is incorporated in a housing 9601. The display portion 9603 can display images. Here, the housing 9601 is supported by a stand 9605.

The television set 9600 can be operated with an operation switch of the housing 9601 or a separate remote controller 9610. Channels and volume can be controlled with an operation key 9609 of the remote controller 9610 so that an image displayed on the display portion 9603 can be controlled. Furthermore, the remote controller 9610 may be provided with a display portion 9607 for displaying data output from the remote controller 9610.

Note that the television set 9600 is provided with a receiver, a modem, and the like. With the use of the receiver, general television broadcasting can be received. Moreover, when the television set 9600 is connected to a communication network with or without wires via the modem, one-way (from a sender to a receiver) or two-way (between a sender and a receiver or between receivers or the like) information communication can be performed.

The display device described in Embodiment 1 can be applied to the display portion 9603. By applying the display device described in Embodiment 1 to the display portion 9603, power consumption of the television set 9600 can be reduced.

Figure 8B:
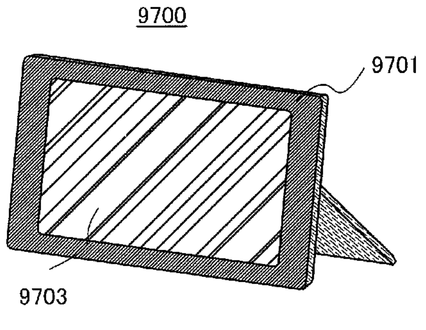

FIG. 8B illustrates an example of a digital photo frame. For example, in a digital photo frame 9700, a display portion 9703 is incorporated in a housing 9701. The display portion 9703 can display a variety of images. For example, the display portion 9703 can display data of an image taken with a digital camera or the like and function as a normal photo frame.

The display device described in Embodiment 1 can be applied to the display portion 9703. By applying the display device described in Embodiment 1 to the display portion 9703, power consumption of the digital photo frame 9700 can be reduced.

Note that the digital photo frame 9700 is provided with an operation portion, an external connection terminal (a USB terminal, a terminal that can be connected to various cables such as a USB cable, or the like), a recording medium insertion portion, and the like. Although these components may be provided on the surface on which the display portion is provided, it is preferable to provide them on the side surface or the back surface for the design of the digital photo frame 9700. For example, a memory storing data of an image taken with a digital camera is inserted in the recording medium insertion portion of the digital photo frame, whereby the image data can be transferred and then displayed on the display portion 9703.

The digital photo frame 9700 may be configured to transmit and receive data wirelessly. The structure may be employed in which desired image data can be transferred wirelessly to be displayed.

Figure 9A:
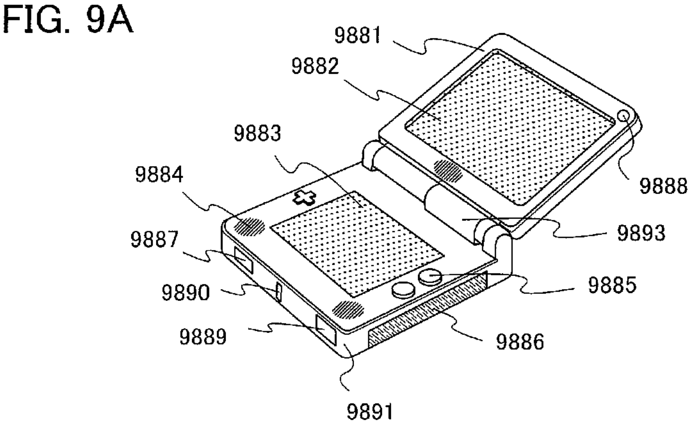
FIGS. 9A and 9B are diagrams each illustrating an electronic appliance.

FIG. 9A illustrates a portable game machine including a housing 9881 and a housing 9891 which are jointed with a connector 9893 so as to be able to open and close. A display portion 9882 and a display portion 9883 are incorporated in the housing 9881 and the housing 9891, respectively.

The display device described in Embodiment 1 can be applied to the display portions 9882 and 9883. By applying the display device described in Embodiment 1 to the display portions 9882 and 9883, power consumption of the portable game machine can be reduced.

The portable game machine illustrated in FIG. 9A additionally includes a speaker portion 9884, a recording medium insertion portion 9886, an LED lamp 9890, an input portion (operation keys 9885, a connection terminal 9887, a sensor 9888 (a sensor having a function of measuring force, displacement, position, speed, acceleration, angular speed, the number of rotations, distance, light, liquid, magnetism, temperature, chemical substance, sound, time, hardness, electric field, current, voltage, electric power, radiation, flow rate, humidity, tilt angle, vibration, smell, or infrared ray), a microphone 9889), and the like. It is needless to say that the structure of the portable game machine is not limited to the above and other structures provided with at least a display device disclosed in this specification may be employed. The portable game machine may include an additional accessory as appropriate. The portable game machine illustrated in FIG. 9A has a function of reading out a program or data stored in a recording medium to display it on the display portion, and a function of sharing information with another portable game machine by wireless communication. The portable game machine in FIG. 9A can have various functions without limitation to the above.

A display device disclosed in this specification can be applied as electronic paper. Electronic paper can be used for electronic appliances of a variety of fields as long as they can display data. For example, electronic paper can be applied to an e-book reader (an electronic book), a poster, an advertisement in a vehicle such as a train, or displays of various cards such as a credit card. An example of electronic appliances which use electronic paper is illustrated in FIG. 9B.

Figure 9B:
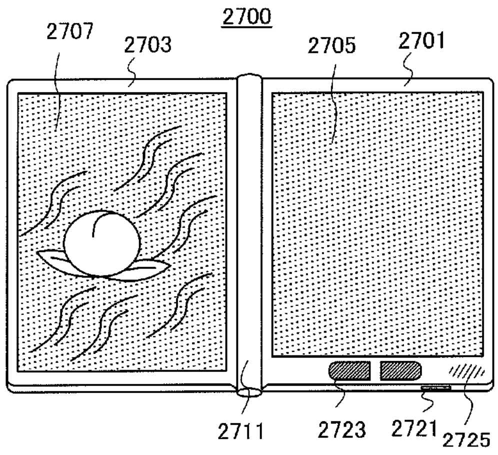

FIG. 9B illustrates an example of an e-book reader. For example, an e-book reader 2700 includes two housings, a housing 2701 and a housing 2703. The housing 2701 and the housing 2703 are combined with a hinge 2711 so that the e-book reader 2700 can be opened and closed with the hinge 2711 as an axis. With such a structure, the e-book reader 2700 can operate like a paper book.

A display portion 2705 and a display portion 2707 are incorporated in the housing 2701 and the housing 2703, respectively. The display portion 2705 and the display portion 2707 may display one image or different images. In the structure where the display portions display different images from each other, for example, the right display portion (the display portion 2705 in FIG. 9B) can display text and the left display portion (the display portion 2707 in FIG. 9B) can display images.

The display device described in Embodiment 1 can be applied to the display portions 2705 and 2707. By applying the display device described in Embodiment 1 to the display portions 2705 and 2707, power consumption of the e-book reader can be reduced.

FIG. 9B illustrates an example in which the housing 2701 is provided with an operation portion and the like. For example, the housing 2701 is provided with a power switch 2721, an operation key 2723, a speaker 2725, and the like. With the operation key 2723, pages can be turned. Note that a keyboard, a pointing device, or the like may also be provided on the surface of the housing, on which the display portion is provided. Furthermore, an external connection terminal (an earphone terminal, a USB terminal, a terminal that can be connected to various cables such as an AC adapter and a USB cable, or the like), a recording medium insertion portion, and the like may be provided on the back surface or the side surface of the housing. Moreover, the e-book reader 2700 may have a function of an electronic dictionary.

The e-book reader 2700 may have a configuration capable of wirelessly transmitting and receiving data. Through wireless communication, desired book data or the like can be purchased and downloaded from an electronic book server.

As described above, the display device and the driving method of a display device which are described in Embodiment 1 can be applied to such a variety of electronic appliances; therefore, electronic appliances in which power consumption is reduced can be provided.

This embodiment can be implemented combining with another embodiment as appropriate.

This application is based on Japanese Patent Application serial no. 2009-281045 filed with Japan Patent Office on Dec. 10, 2009, the entire contents of which are hereby incorporated by reference.

The invention claimed is:

1. A display device comprising:

a judging and image-data-processing circuit including a judging circuit and a judge data storing circuit;

a data storing circuit operationally connected to the judging and image-data-processing circuit; and a gate signal generating circuit and a source signal generating circuit, each operationally connected to the judging and image-data-processing circuit, wherein the data storing circuit is configured to store a first image data of a first frame, a second image data of a second frame, and a third image data of a third frame, wherein the judging circuit is configured to divide the first image data of the first frame, the second image data of the second frame, and the third image data of the third frame into a first plurality of image data, a second plurality of image data, and a third plurality of image data respectively, judge whether each of the first plurality of image data matches with corresponding one of the second plurality of image data, output a first judge data of the first image data including the first plurality of image data and the second image data including the second plurality of image data, judge whether each of the second plurality of image data matches with corresponding one of the third plurality of image data, and output a second judge data of the second image data including the second plurality of image data and the third image data including the third plurality of image data, wherein the judge data storing circuit is configured to store the first judge data and the second judge data, wherein the gate signal generating circuit and the source signal generating circuit are configured to control writing of each the second plurality of image data in accordance with the first judge data, and control writing of each the third plurality of image data in accordance with the second judge data, wherein the first judge data and the second judge data in sequential frame periods of the first frame, the second frame, and the third frame are accumulated in the judge data storing circuit, and wherein the first judge data and the second judge data are output from the judge data storing circuit at once.

2. The display device according to claim 1, further comprising a reference signal generating circuit configured to control the gate signal generating circuit and the source signal generating circuit.

3. The display device according to claim 1, further comprising a pixel portion including a thin film transistor.

4. The display device according to claim 3, wherein the thin film transistor includes an oxide semiconductor film.

5. A display device comprising:

a judging and image-data-processing circuit including a judging circuit and a judge data storing circuit;

a data storing circuit operationally connected to the judging and image-data-processing circuit; and a gate signal generating circuit and a source signal generating circuit, each operationally connected to the judging and image-data-processing circuit, wherein the data storing circuit is configured to store a first image data of a first frame, a second image data of a second frame, and a third image data of a third frame, wherein the judging circuit is configured to divide the first image data of the first frame, the second image data of the second frame, and the third image data of the third frame into a first plurality of image data, a second plurality of image data, and a third plurality of image data for a plurality of gate lines included in the gate signal generating circuit, judge whether each of the first plurality of image data matches with corresponding one of the second plurality of image data, output a first judge data of the first image data including the first plurality of image data and the second image data including the second plurality of image data, judge whether each of the second plurality of image data matches with corresponding one of the third plurality of image data, and output a second judge data of the second imincluding the second plurality of image data and the third image data including the third plurality of image data wherein the judge data storing circuit is configured to store the first judge data and the second judge data, wherein the gate signal generating circuit and the source signal generating circuit are configured to control writing of each the second plurality of image data in accordance with the first judge data, and control writing of each the third plurality of image data in accordance with the second judge data, wherein the first judge data and the second judge data in sequential frame periods of the first frame, the second frame, and the third frame are accumulated in the judge data storing circuit, and wherein the first judge data and the second judge data are output from the judge data storing circuit at once.

6. The display device according to claim 5, further comprising a reference signal generating circuit configured to control the gate signal generating circuit and the source signal generating circuit.

7. The display device according to claim 5, further comprising a pixel portion including a thin film transistor.

8. The display device according to claim 7, wherein the thin film transistor includes an oxide semiconductor film.

9. A driving method of a display device comprising the steps of:

storing a first image data of a first frame, a second image data of a second frame, and a third image data of a third frame;

dividing the first image data of the first frame, the second image data of the second frame, and the third image data of the third frame into a first plurality of image data, a second plurality of image data, and a third plurality of image data respectively;

judging whether each of the first plurality of image data matches with corresponding one of the second plurality of image data to obtain a first judge data of the first image data including the first plurality of image data and the second image data including the second plurality of image data;

judging whether each of the second plurality of image data matches with corresponding one of the third plurality of image data to obtain a second judge data of the second image data including the second plurality of image data and the third image data including the third plurality of image data storing the first judge data and the second judge data in a judge data storing circuit;

controlling writing of each the second plurality of image data depending upon whether each of the first plurality of image data matches with corresponding one of the second plurality of image data; and controlling writing of each the third plurality of image data depending upon whether each of the second plurality of image data matches with corresponding one of the third plurality of image data, wherein the first judge data and the second judge data in sequential frame periods of the first frame, the second frame, and the third frame are accumulated in the judge data storing circuit, and wherein the first judge data and the second judge data are output from the judge data storing circuit at once.

10. The driving method of the display device according to claim 9, wherein the first image data of the first frame and the second image data of the second frame are divided by each a plurality of gate lines.

* * * * *

UNITED STATES PATENT AND TRADEMARK OFFICE

CERTIFICATE OF CORRECTION

PATENT NO. : 8,704,806 B2
APPLICATION NO. : 12/961029
DATED : April 22, 2014
INVENTOR(S) : Yoshiharu Hirakata and Shunpei Yamazaki It is certified that error appears in the above-identified patent and that said Letters Patent is hereby corrected as shown below:

In the Specification

Column 12, line 52, replace "$\rho$=*RAIL*" with --$\rho$=*RA/L*--;

Column 12, line 59, after "is W" insert --.--;

Column 24, line 39, after "example, R, G" insert --,--;

In the Claims

Column 31, line 15, in claim 1 replace "imincluding" with --image data including--;

Column 31, line 17, in claim 1 after "of image data" insert --,--;

Column 32, lines 19-20, in claim 9 after "of image data" insert --;--.

Signed and Sealed this
Eighteenth Day of November, 2014

Michelle K. Lee
*Deputy Director of the United States Patent and Trademark Office*